United States Patent
Gaudreau

(10) Patent No.: US 7,705,935 B2
(45) Date of Patent: Apr. 27, 2010

(54) STEREOSCOPIC DISPLAY SYSTEM

(75) Inventor: Jean-Etienne Gaudreau, Longueuil (CA)

(73) Assignee: Ecrans Polaires Inc., Quebec (CA)

( * ) Notice: Subject to any disclaimer, the term of this patent is extended or adjusted under 35 U.S.C. 154(b) by 73 days.

(21) Appl. No.: 10/586,108

(22) PCT Filed: Jan. 20, 2005

(86) PCT No.: PCT/CA2005/000065

§ 371 (c)(1),
(2), (4) Date: Jul. 5, 2007

(87) PCT Pub. No.: WO2005/069269

PCT Pub. Date: Jul. 28, 2005

(65) Prior Publication Data

US 2008/0246897 A1    Oct. 9, 2008

(51) Int. Cl.
*G02F 1/1335* (2006.01)
*G02F 1/13* (2006.01)

(52) U.S. Cl. ............... 349/96; 349/1; 349/5; 349/15

(58) Field of Classification Search ............ 385/5, 385/15
See application file for complete search history.

(56) References Cited

U.S. PATENT DOCUMENTS

| | | | |
|---|---|---|---|
| 5,629,798 A | 5/1997 | Gaudreau | |
| 6,034,818 A | 3/2000 | Sedlmayr et al. | |
| 6,452,646 B1 | 9/2002 | Sharp et al. | |
| 6,529,250 B1* | 3/2003 | Murakami et al. | 349/5 |
| 7,058,252 B2* | 6/2006 | Woodgate et al. | 385/16 |
| 2006/0017860 A1* | 1/2006 | Adachi et al. | 349/1 |

* cited by examiner

*Primary Examiner*—Uyen-Chau N Le
*Assistant Examiner*—Chris H Chu
(74) *Attorney, Agent, or Firm*—Fay Kaplun & Marcin, LLP

(57) ABSTRACT

There is provided a polarized display, comprising: an intensity modulating matrix display having a front surface; and a polarizing matrix display panel in front of said intensity modulating matrix display, the polarizing matrix display panel having a front surface; wherein the display is one of: a linear polarization display, each pixel of the polarizing matrix display panel being controllable and a rotation of a generated polarized light being varied over a range including 90 degrees and below; and: an elliptical polarization display, each pixel of the polarizing matrix display panel being controllable and a phase between a fast and a slow axes of a polarized light coming from a corresponding pixel of the intensity modulating matrix display in a range including 180 degrees and below.

29 Claims, 22 Drawing Sheets

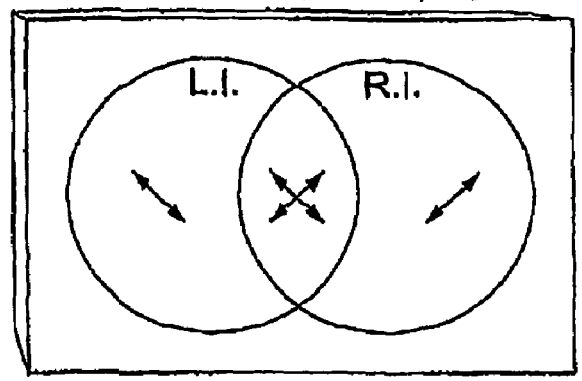
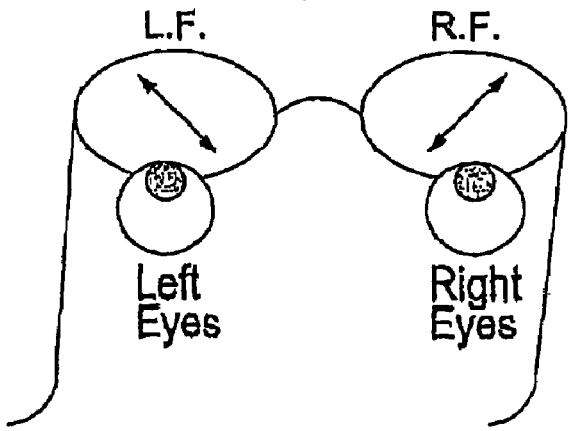
FIG. 1 (PRIOR ART)
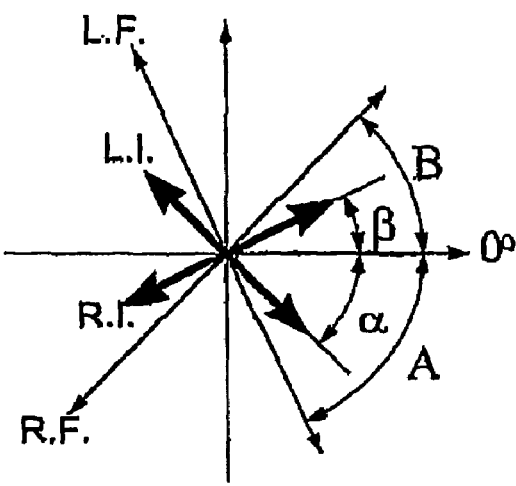
FIG. 2

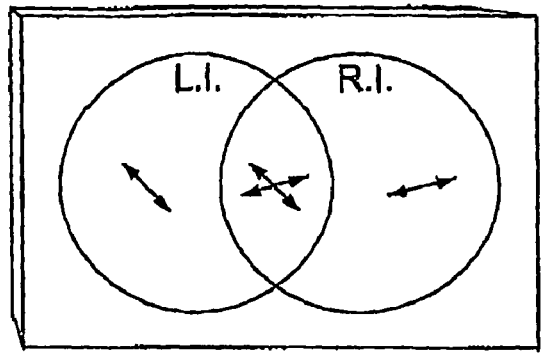
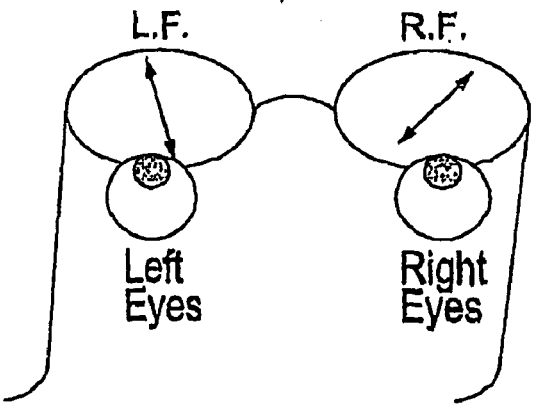
FIG. 3
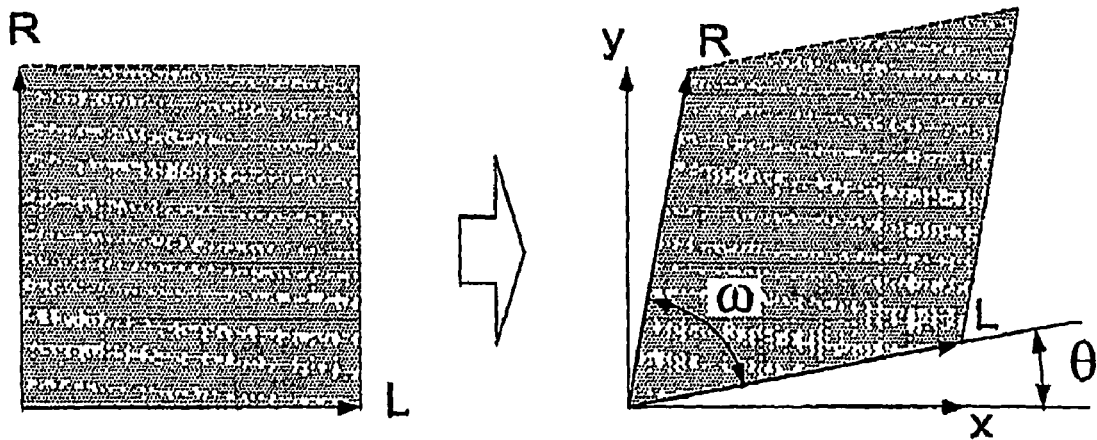
FIG. 4

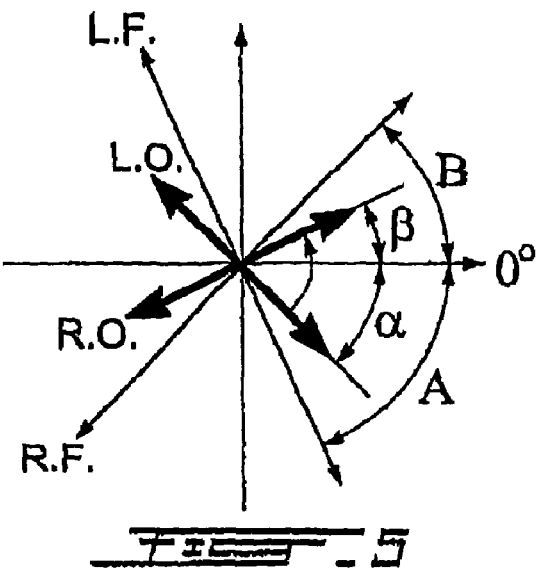
FIG. 5
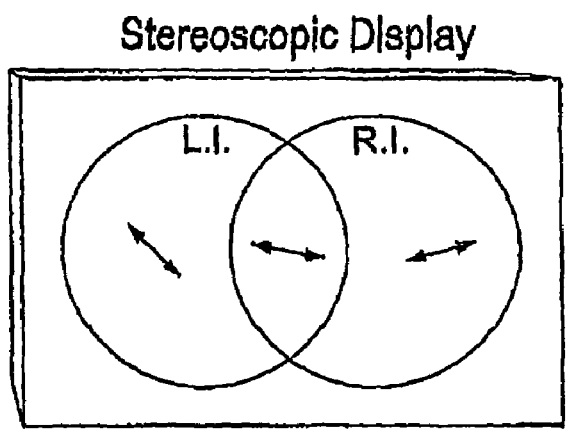
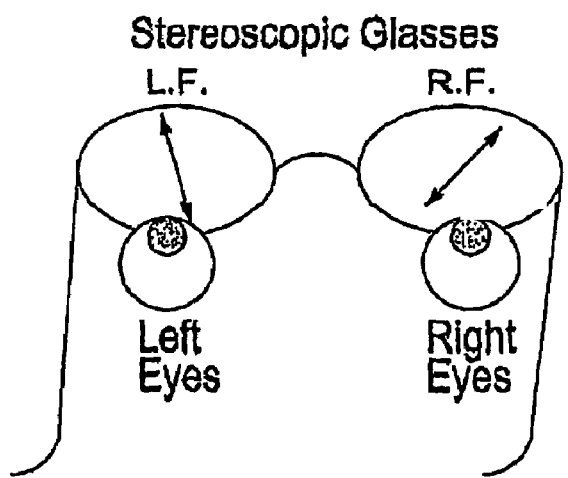
FIG. 6

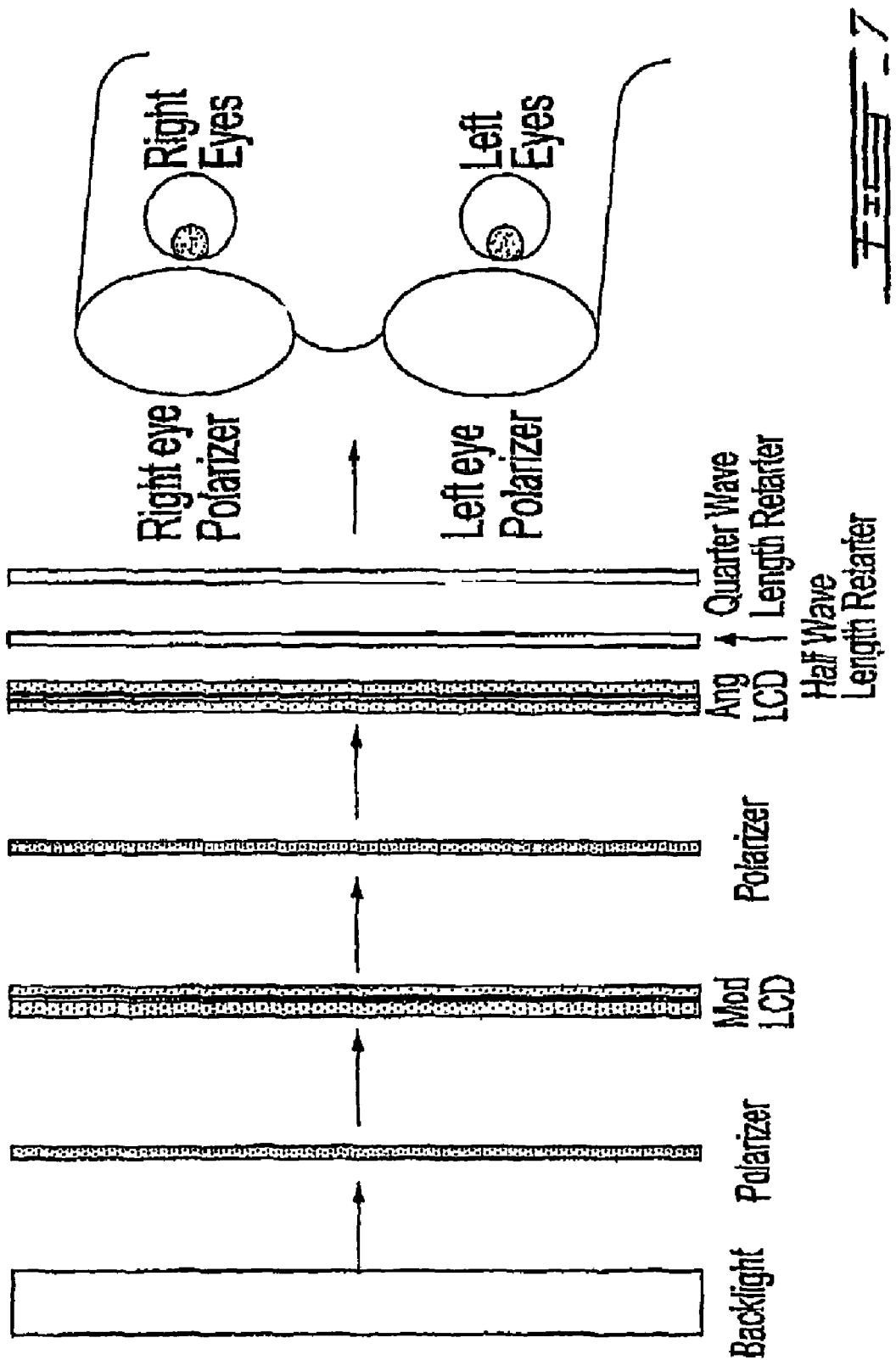

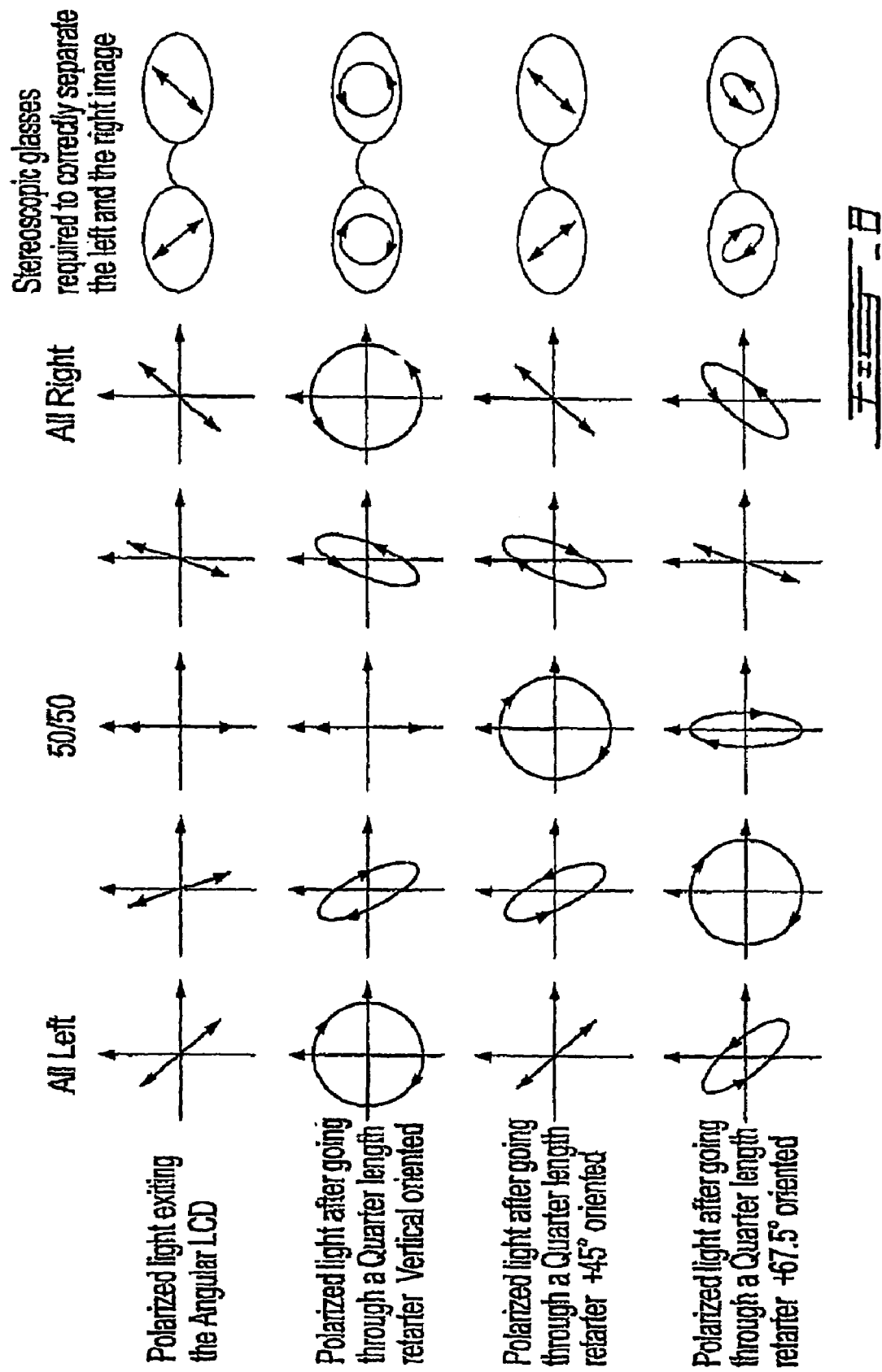

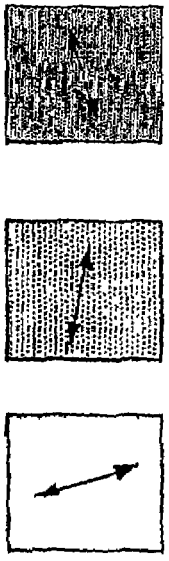
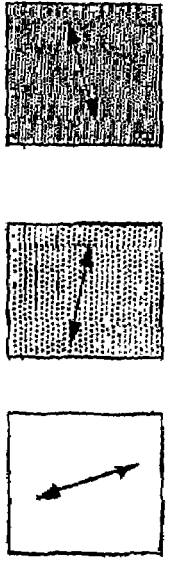
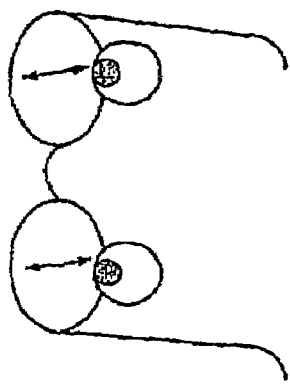
FIG. 6

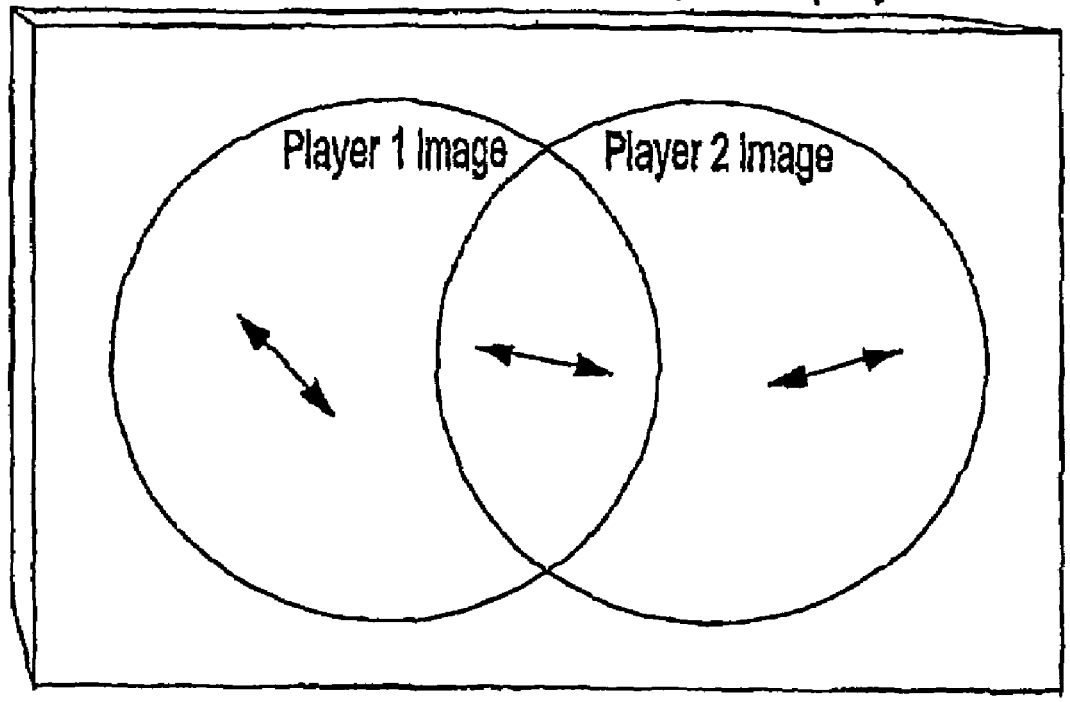
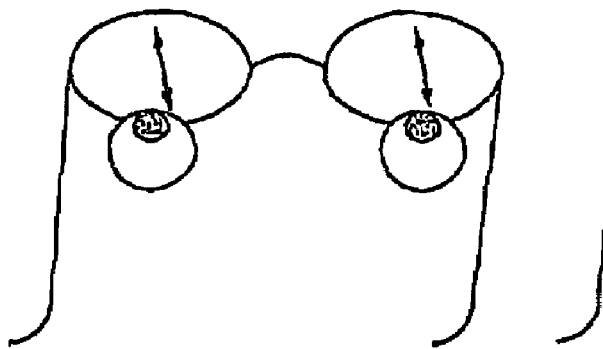 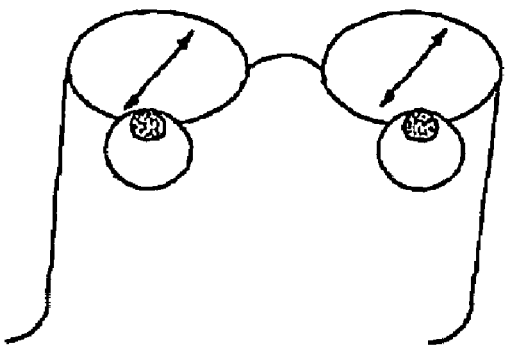
FIG. 10

PolarScreens Stereoscopic Display
Only the person wearing the polarized glasses see the images, the other see a white screen.
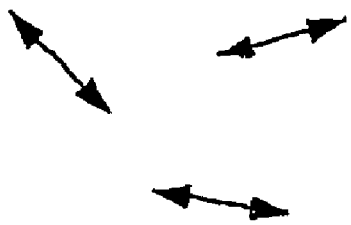
Private Glasses
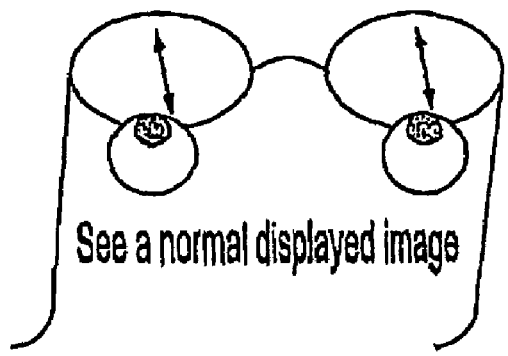
See a normal displayed image
See white screen !
FIG. 11

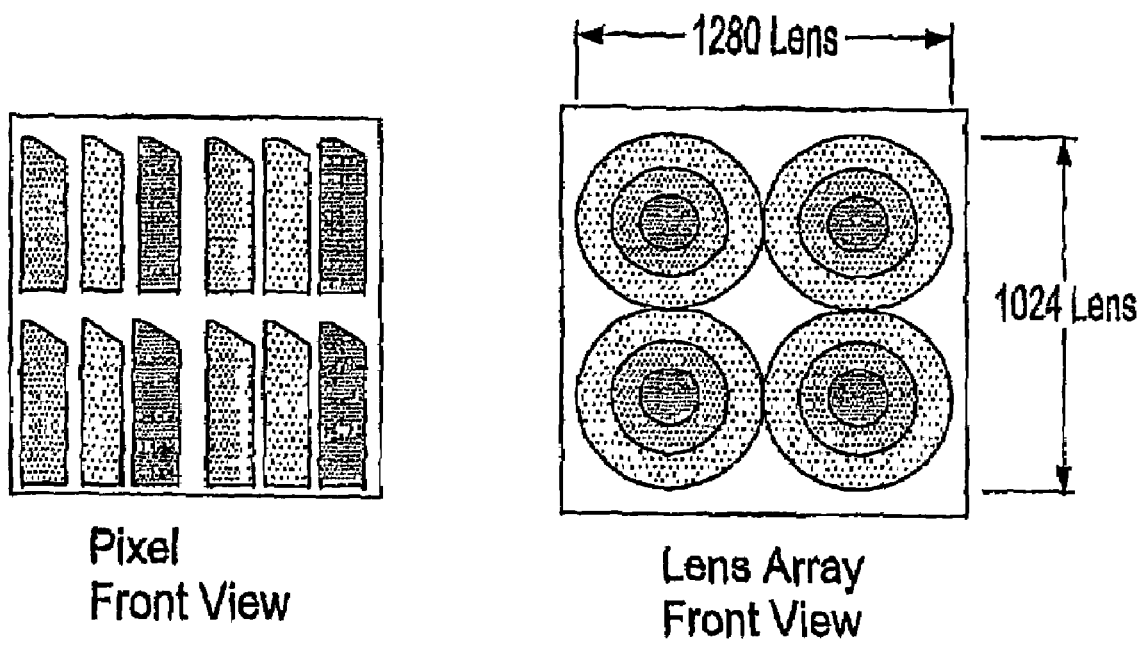

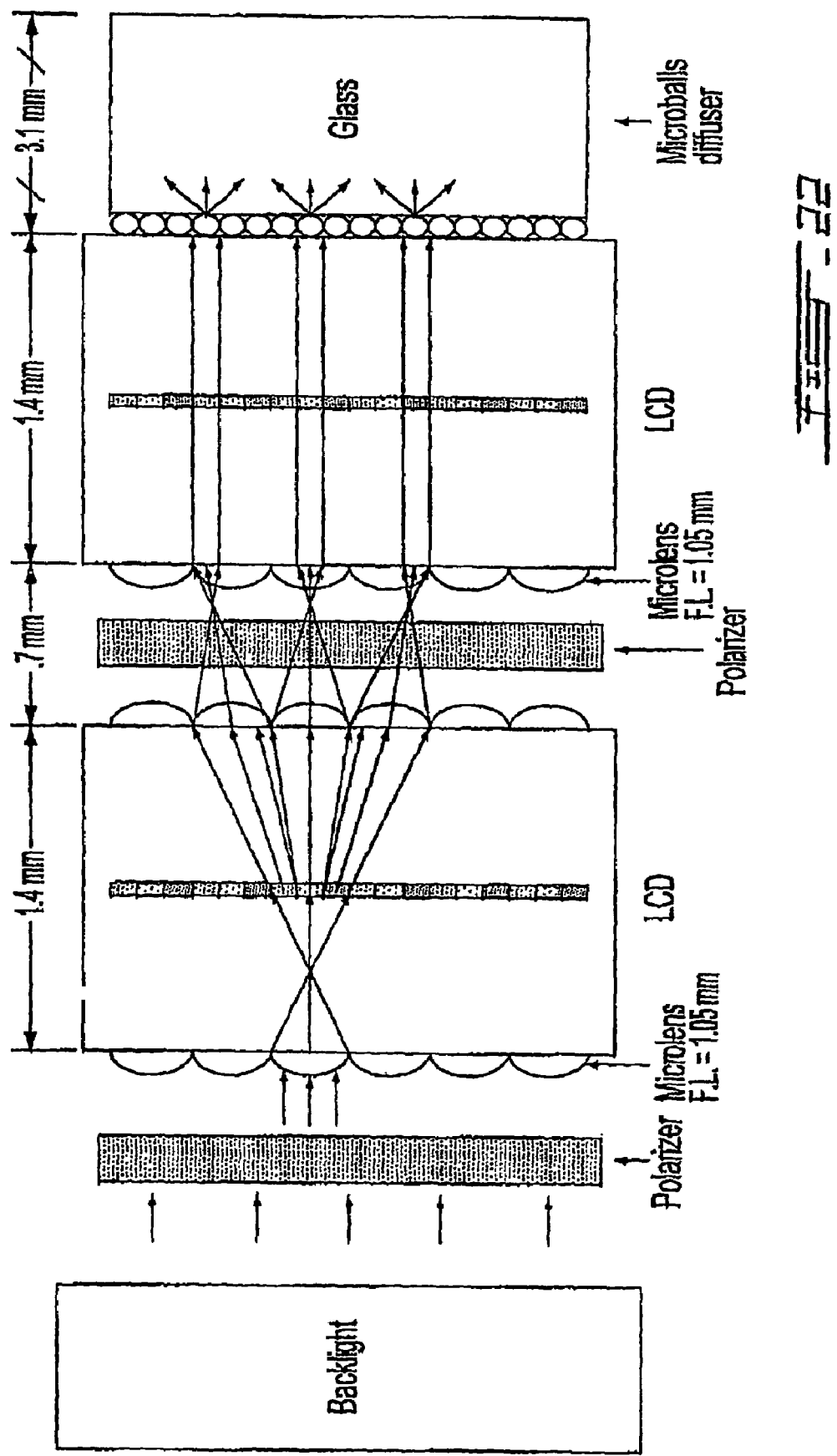

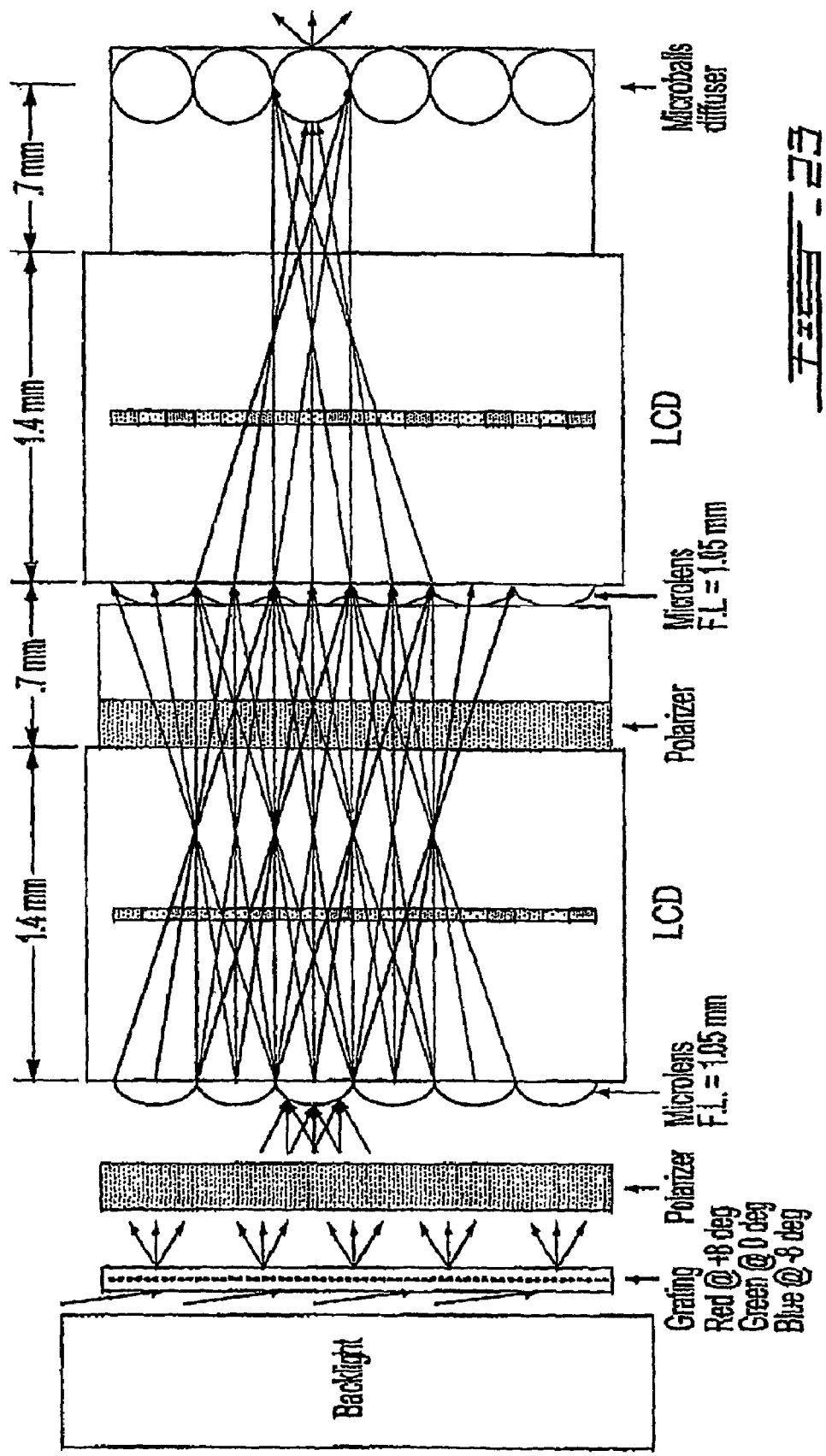

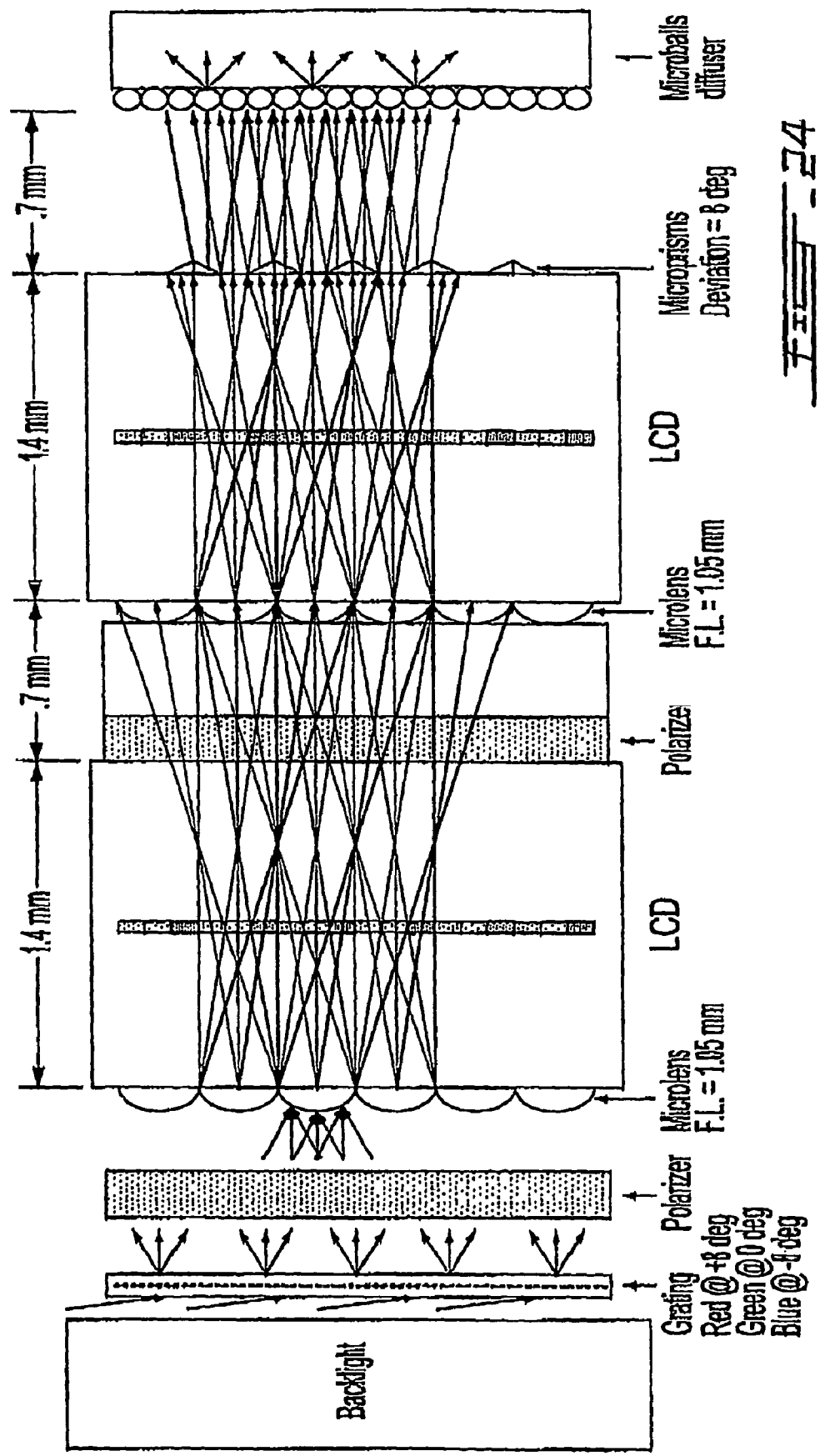

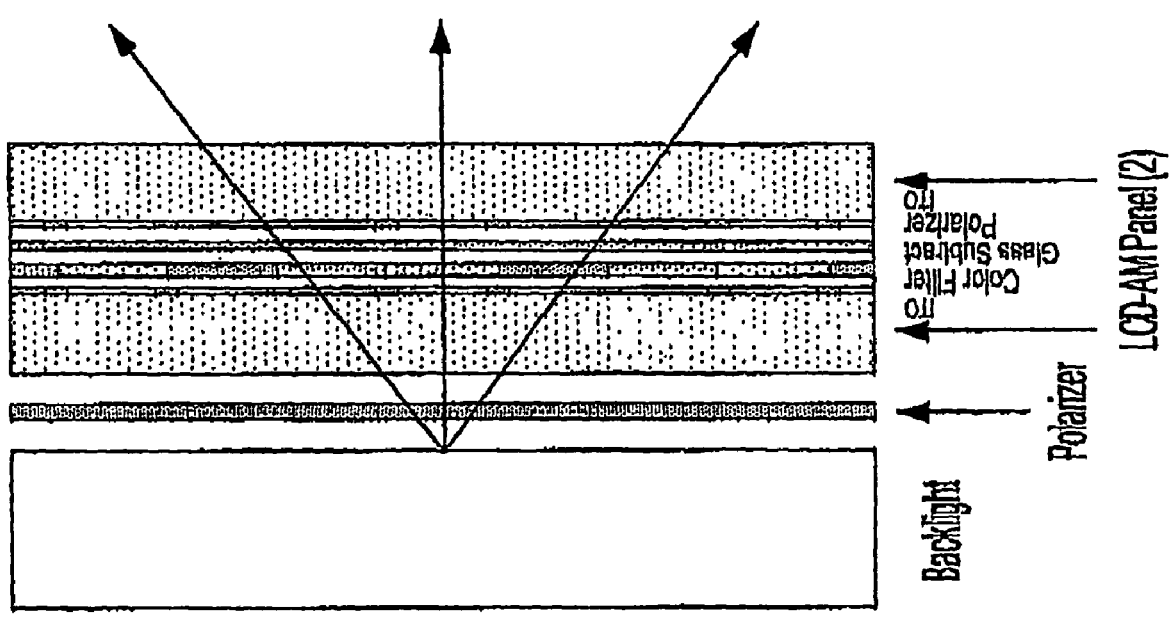

STEREOSCOPIC DISPLAY SYSTEM

FIELD OF THE INVENTION

The present invention relates to stereoscopic display systems. More specifically, the present invention is concerned with high quality flat panel stereoscopic display systems.

BACKGROUND OF THE INVENTION

Stereoscopic technology is used to create realistic games or scenery providing depth to objects, by presenting a unique view to each eye of a viewer almost the same way the viewer would view objects in real life. In polarization technology, linear polarized and circularly polarized lights as well as a combination thereof, referred to as elliptically polarized light, are used.

A conventional stereoscopic display system uses passive polarized stereoscopic glasses comprising two filters at 90° from each other and generates two images polarized at 90° from each other. FIG. 1 illustrates such a system, where L.I. is a left image intended to be seem by the left eye only, R.I. is a right image intended to be seem by the left eye only, L.F. is a polarized left filter, which lets only the left image go through, and R.F. is a polarized right filter, which lets only the right image go through.

In liquid crystal display (LCD) technology, three types of active matrix Thin Film Transistor (TFT) LCD are used: Twist Nematic (TN), In-Plane Switching—(IPS) and Multi-domain Vertical Alignment (MVA). A LCD display consists essentially of two sheets of glass separated by a sealed-in liquid crystal material, which is normally transparent. A voltage applied between front and back electrode coatings disrupts an orderly arrangement of the liquid crystal molecules, darkening the liquid enough to form visible characters.

In a U.S. Pat. No. 5,629,798 issued to the present applicant, a deep 3D perception is achieved by showing two images from a different point of view corresponding to each eye of the viewer, as in stereoscopy, with a unique advantage of displaying the two images without multiplexing them in time nor in space as is usually the case in most others stereoscopic technologies. The method consists in adjusting, for each picture element individually, the intensity of light as a function of the intensity value of two corresponding pixels in the left and right images, and polarizing, for each picture element individually, at an angle depending on the value of the two corresponding pixels of the left and right images. The resulting display is similar to any conventional LCD monitor but it comprises two LCD panels. The display comprises a series of layers, comprising, from back to front, a back light panel, a first polarized filter, a first LCD panel (Mod LCD), a second polarized filter and a second LCD panel (Ang LCD). The first LCD panel controls the pixel intensity for both eyes while the second LCD panel controls the distribution to one eye or the other. To generate a stereoscopic image, the left and right images are converted into a modulo (driving the first LCD) and an angular (driving the second LCD) images using the following relations:

$$Modulo = \sqrt{(left^2 + right^2)} \quad (1)$$

$$Angular = \arctan\left(\frac{left}{right}\right) \quad (2)$$

The orthogonal polarized filters of the passive glasses recreate the left and the right image for the left and the right eyes, since these polarized filters act as cosine and sine trigonometric functions as follows:

$$\sqrt{(left^2 + right^2)} \cdot \cos\left(\arctan\left(\frac{left}{right}\right)\right) = left \quad (3)$$

$$\sqrt{(left^2 + right^2)} \cdot \sin\left(\arctan\left(\frac{left}{right}\right)\right) = right \quad (4)$$

In spite of developments in the field, there is room for further improvements in the field of high quality flat panel stereoscopic displays.

SUMMARY OF THE INVENTION

In accordance with the present invention, there is provided a polarized display, comprising: an intensity modulating matrix display having a front surface; and a polarizing matrix display panel in front of said intensity modulating matrix display, the polarizing matrix display panel having a front surface; wherein the display is one of: a linear polarization display, each pixel of the polarizing matrix display panel being controllable and a rotation of a generated polarized light being varied over a range including 90 degrees and below; and: an elliptical polarization display, each pixel of the polarizing matrix display panel being controllable and a phase between a fast and a slow axes of a polarized light coming from a corresponding pixel of the intensity modulating matrix display in a range including 180 degrees and below.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 1 labeled "Prior Art", is a diagram of a conventional stereoscopic display system;

FIG. 2 is a graphic representation of a non-orthogonal polarized stereoscopic display according to an embodiment of a first aspect of the present invention;

FIG. 3 is a diagram of the non-orthogonal polarized stereoscopic display of FIG. 2;

FIG. 4 is a diagram of conversion from an orthogonal system into an oblique system;

FIG. 5 is a graphic representation of the non-orthogonal polarized stereoscopic display of FIG. 2 in polar coordinates;

FIG. 6 is a diagram of the non-orthogonal polarized stereoscopic display according to an embodiment of the present invention in the polar coordinates of FIG. 5;

FIG. 7 illustrates a system with a haft-length retarder and a quarter-length retarder sheet in the front of the display according to an embodiment of the present invention;

FIG. 8 illustrates effects of the orientation of an optical axis of the retarder sheet of FIG. 7;

FIG. 9 illustrates alternatives of the system of FIGS. 7 and 8;

FIG. 10 illustrates an application of the systems of FIGS. 7 to 9;

FIG. 11 illustrates an application the systems of FIGS. 7 to 10 for two players in a game;

FIG. 21 illustrates a lens arrays matching the LCD pixel pitch;

FIG. 22 illustrates a display according to a further embodiment of the present invention;

FIG. 23 illustrates a display using micro-ball array with black mask may be further used to diffuse the light without de-polarizing the light according to a further embodiment of the present invention;

FIG. 24 illustrates a display using a micro-prism according to a further embodiment of the present invention;

FIG. 27 illustrates a display using an integrated LCD according to a further embodiment of the present invention.

DESCRIPTION OF EMBODIMENTS OF THE INVENTION

Figure 12:
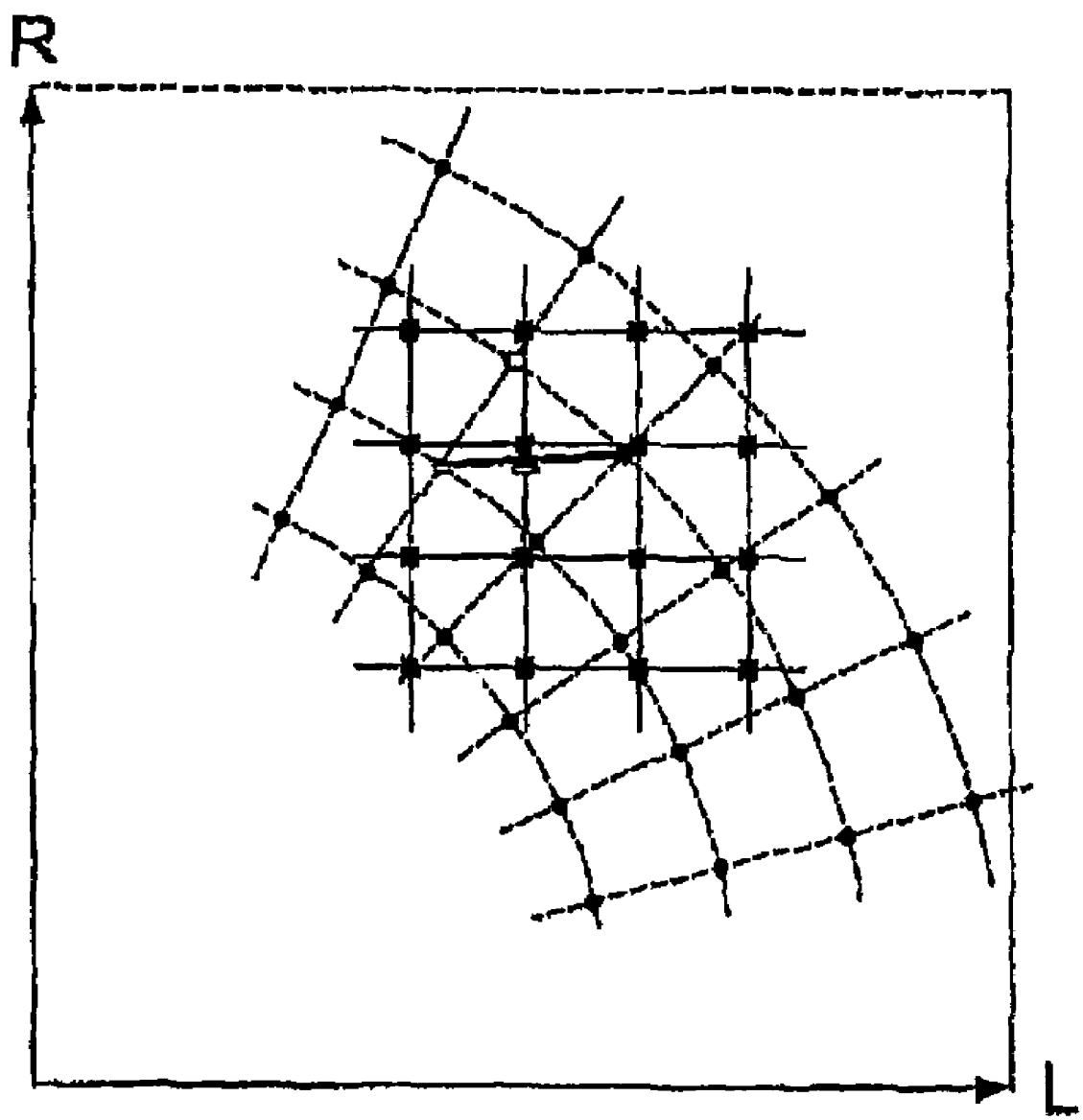
FIG. 12 shows a portion of a left-right discrete matrix (fine line) and a Modulo-Angular (dotted line) discrete matrix.

Generally stated, there is provided a polarized stereoscopic system comprising two polarized filters and generating two polarized images, wherein, contrary to conventional stereoscopic systems (FIG. 1), i) the two polarized filters are not necessary located at 90°, ii) the angle of a polarized image is not the same as a corresponding polarized filter i.e. the left filter is not at the left image angle and the right image is not at the same angle than the right filter, and iii) the system of angles is selected is such a way to cancel stereoscopic cross-talk, i.e. leakage from the right image to the left image and vice versa.

FIGS. 2 and 3 illustrate a non-orthogonal polarized stereoscopic display system according to an embodiment of the present invention, in a Cartesian system of angles. It comprises passive polarized stereoscopic wearing glasses (see FIG. 3) with a left linear polarized filter L.F. at an angle "A", which is at 90° from a linear polarization angle $\beta$ of a right image R.I., and a right linear polarized filter R.F. at an angle "B", which is at 90° from a linear polarization angle $\alpha$ of a left image L.I. It generates two images polarized at an angle $\omega$ from each other, where $\omega = \alpha + \beta$.

In such a system, the intensity of the left image L.I. after passing thought the left filter L.F. is attenuated by a factor of cosine of the angle between the left filter L.F. and the left image L.I., i.e. $\cos(A-\alpha)$, while the intensity of the left image L.I. after passing thought the right filter R.F. is null since the angle ($\alpha$+B) equals 90° by design and cos(90°) equals zero. Likewise, the intensity of the right image R.I. after passing thought the right filter R.F. is attenuated by a factor of cosine of the angle between the right filter R.F. and the right image R.I., i.e. $\cos(B-\beta)$, while the intensity of the right image R.I. after passing thought the left filter L.F. is null since the angle ($\beta$+A) equals 90° by design and cos(90°) equals zero.

As in the present applicant's previous patented polar stereoscopic display system discussed hereinabove, a pixel is subdivided in three sub-pixels controlling the red, green and blue intensities of the pixel respectively, and each corresponding sub-pixels of the left and the right is converted into modular and angular values used to drive the first and the second LCDs of the polar stereoscopic display respectively, following relations (1) and (2) given hereinabove, where left is a value of the sub-pixel of the left image corresponding to a same sub-pixel on the right image, and right is a value of a sub-pixel of the right image corresponding to a same sub-pixel on the left image.

Since now the system is non-orthogonal, the left and right values are converted from the Cartesian system to the oblique system of angles $\omega$ as shown in FIG. 4, where L refers to the value of the sub-pixel of the left image corresponding to the same sub-pixel on the right image, R is the value of the sub-pixel of the right image corresponding to the same sub-pixel on the left image, x is the transformed L value, y is the transformed R value, $\omega = \alpha + \beta$ is a polarization angle between the two images, and $\theta = A - \alpha$ is a polarization angle between the left filter and the left image.

The x and y values may be calculated using the following relations:

$$x = L\cos(\omega+\theta) + R\cos(\omega+\theta) \quad (5)$$

$$y = L\sin(\theta) + R\sin(\omega+\theta) \quad (6)$$

Since $90 - (\omega+\theta) = \theta$ then $$x = L\cos(\theta) + R\sin(\theta) \quad (7)$$

$$y = L\sin(\theta) + R\cos(\theta) \quad (8)$$

and relations (1) and (2) become:

$$Modulo' = \sqrt{(x^2 + y^2)} \quad (9)$$

$$Angular' = \arctan\left(\frac{y}{x}\right) \quad (10)$$

Using relations (7) and (8), relations (9) and (10) yield:

$$Modulo' = \sqrt{(L^2\cos^2\theta + 2\ L\ R\ \cos(\omega+\theta) + R^2\cos^2(\omega+\theta))} \quad (11)$$

$$Angulo' = \arctan\left(\frac{L\cos\theta + R\cos(\omega+\theta)}{L\sin\theta + R\sin(\omega+\theta)}\right) \quad (12)$$

Applying the Modulo' and Angular' transformation yields a polarized angle with a range of ω (from α to β) as shown in the diagram of FIG. 5. L.O. is a left orientation of a sub-pixel angle value, when the right sub-pixel value is zero or negligible compared to the corresponding left sub-pixel value. It is a minimum generated angular value. R.O. is a right orientation of a sub-pixel angle value, when the left sub-pixel value is zero or negligible compared to the corresponding right sub-pixel value. It is a generated angular maximum value.

The recovery of L and R from Modulo' and Angular' with filter at A and B angles of the non-orthogonal polarized passive glasses recreate the left and the right image for the left and the right eyes as follows:

$$\sqrt{(L^2 + 4LR\cos\theta\sin\theta + R^2)} \cdot \cos\left(\arctan\left(\frac{L\sin\theta + R\cos\theta}{L\cos\theta + R\sin\theta}\right) + \theta\right) = \text{left} \cdot \cos(2\theta) \quad (13)$$

$$\sqrt{(L^2 + 4LR\cos\theta\sin\theta + R^2)} \cdot \sin\left(\arctan\left(\frac{L\sin\theta + R\cos\theta}{L\cos\theta + R\sin\theta}\right) - \theta\right) = \text{right} \cdot \cos(2\theta) \quad (14)$$

FIG. 6 shows the resulting non-orthogonal polarized polar stereoscopic display system.

Interestingly, all principles of this non-orthogonal linear polarization system apply to circular polarization stereoscopic systems. A conventional circular polarized stereoscopic display system uses left-handed and right-handed circular polarized filters to separate the left and the right images. The transformation from a linear polarized system to a circular polarized system and vice versa is performed by means of quarter length retarder films, wherein a fast axis of a retarder film placed at mid angle between the left and the right linear polarized angle transforms the linear polarized light into circular polarization light. In a non-orthogonal circular polarization stereoscopic display system, the linear polarization is thus transformed into an elliptical polarization light by using appropriate elliptical polarized filters instead of the circular polarized filter.

People in the art will appreciate that the present invention accommodates the low angular range of available commercial LCD panels. Indeed few of these commercial AM-LCD panels turn the light with a range of at least 90°, ranges varying, depending on the technologies such as TN, IPS or MVA, on manufacturers, and on LCD channel amplifier bias, between as low as 65° up to 85°. Moreover, these ranges vary between each primary color: for example, one tested panel may have the red varying from 45° to −25° while the blue varies from 45° to −40°. The non-orthogonal polarized stereoscopic system of the present invention may be adapted for each color, based on the same common polarized glasses.

People in the art will further appreciate that this aspect of the present invention allows a zero cross talk in a polar stereoscopic display system, as well as a faster switch in a CRT-LC panel stereoscopic display system, and a capacity to overdrive LCD at the extremes ends of angle swing for faster response. Moreover, it allows displaying two independent images polarized at an angle other than 90°.

By introducing a haft-length retarder and a quarter-length retarder sheet in the front of the display as illustrated in FIG. 7, there is provided an elliptical polarized stereoscopic display system. FIG. 8 shows how the orientation of the optical axis of the retarder sheet affects the paradigm of the polarization stereoscopic. Moreover, the half-length retarder sheet may modify the orientation range of the linear polarization portion of the light resulting in even more permutation of linear and circular polarization system.

Therefore, using retarder sheets may increase the number of permutation in the non-orthogonal stereoscopic display system. Some of these permutations allow the selection of stereoscopic glasses where the left and the right elliptical polarized filters have the same amount of light going therethrough when the glasses are placed in front of each other, in such a way that a first person wearing the glasses may look comfortably at a second person wearing similar glasses. Moreover, permutations of filter allow a people wearing them to look comfortably at another LCD monitor.

People in the art will appreciate that this aspect of the present invention reduces the discomfort typically encountered in others stereoscopic polarized glasses, when looking at regular LCD monitor, wherein one eye sees the image on the monitor but the other eyes see black image, and when looking at another person wearing similar glasses, wherein one eye sees only a first eye of the first person and the other eye sees the second eye of the first person, which results very confusing for the brain.

The present invention provides lock-up tables for rectangular to polar conversion system, for conversion of a live video, described hereinbelow in details, which allows resolving high processing power required to transform left and right images in Modulo and Angular images in real time, and also allows reducing cross-talk by individual combined values (left and right color values).

As discussed hereinabove, to generate a stereoscopic image, the left and right images are converted to modular and angular values, for every sub-pixel as shown in the following diagram:

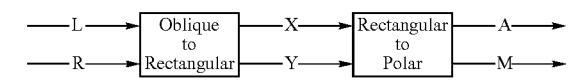

The pixel light intensity of a regular LCD monitor has a linear response, with or without gamma correction, to a voltage or a value of the signal input. For the modulo signal of a polar system, a Gamma correction is introduced to the Modulo feed in order to obtain a linear LCD pixel M', and a Sinus transformation is used to compensate the LCD light intensity linear response so that the Angular signal generates a linear angular response A', as follows:

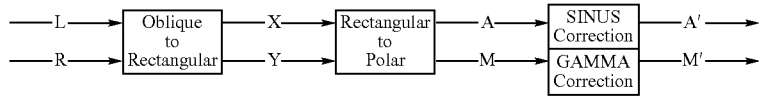

Adjustment may be further introduced to compensate for a non-perfect response of LCD panel due to polarized filter and electronic, as follows:

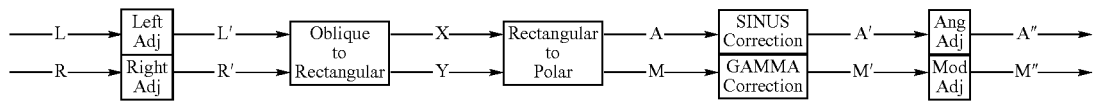

This processing of the signals may be integrated and stored in a memory used as a Lock-up table, as follows:

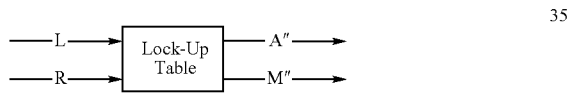

Since each pixel color may have different parameters, a corresponding number of LUT (Lock-Up Tables) are used, one for each color, as shown below:

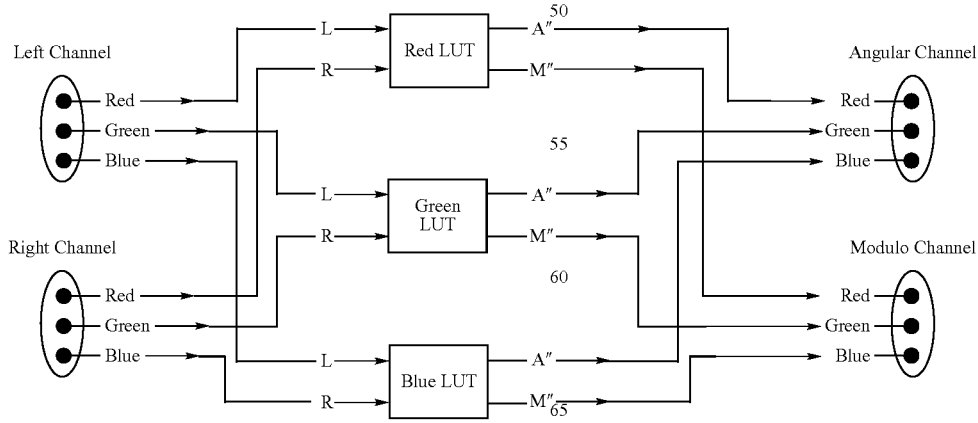

The LUT may be implemented in SRAM (static random access memory), as exemplified below:

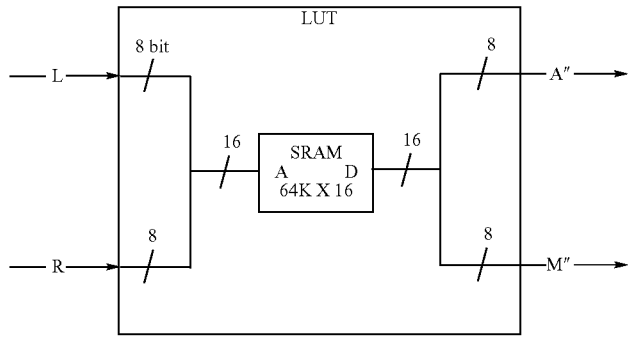

People in the art will appreciate that the LUT (Lock-Up Table) is a unique and cost effective tool for achieving a sub-pixel frequency of a 1280×1024 at 85 Hz refresh rate, which requires a transformation processing clocked at 480 MHz. Moreover, the LUT makes it easier to introduce any desired adjustment.

The present invention further allows enhanced contrast and color resolution, whereby the quality of a polar display in normal mode (2D) of may surpass currently available LCD displays by using the front LCD as a second light valve and controlling both LCD's in conjuncture in order to increase a number of available intensity levels. It is also possible to obtain blacker black pixel intensity by blocking more light using both LCD's.

Simply wearing a different type of polarized glassed (not 3D i.e. both eyes have the same angle) or putting a removable filter sheet on top of the display activates the second LCD as a light valve, instead of as a light twister in stereoscopic mode, which results in more than twice the contrast ratio, 10 bit per color resolution, as illustrated in FIG. 9.

This feature allows private displays, characterized in that, by showing the image on the second LCD while displaying a complete white image on the first LCD, only the person wearing the polarized glasses (same as for enhanced contrast) is able to see the screen, while other people only see a white screen (FIG. 10).

Furthermore, instead of showing a white image on the first LCD of the private display, it is possible to show a fake image that people not wearing the polarized glasses see, giving them the illusion of a normal display, while the person wearing the glasses actually looks at a different image. The private image to be shown on the second LCD is processed to remove the first image for the person wearing the polarized glasses. The image on the first LCD is selected or transformed to have enough brightness at every pixel so that each pixel of the second LCD has sufficient light to display the private Image.

In the case of two players in a game or example, each player may thus see different images on the same display. The first player wears glasses with both eyes at a first polarized orientation and the second player wear glasses at a second polarized orientation. The two orientations may be orthogonal or non-orthogonal as discussed earlier hereinabove (FIG. 11).

Therefore, the same display may switch, at the push of a button for example, between a normal 2D screen, a stereoscopic screen (by wearing passive 3D glasses), an enhanced 2D screen (by adding a film on the display surface), a security display screen (where only the person wearing special glasses see the image), and a two players-two displays-single screen-full screens display screen.

Another problem may be solved in the present invention, such as cross talk, which may be reduced by using 2D matrix average of alternative display field. Indeed, digitalization (for converting the signal to discrete levels, for example 256 levels) of the modular and angular signal leads to quantization errors, which in turn may cause cross talk. Even if the Cartesian to polar conversion does not generate errors, errors may still be caused by rounding of the modular and angular values, which in turn may creates a difference between the original left and right values and the display intensities.

FIG. 12 shows a portion of a left-right discrete matrix fine line) and a Modulo-Angular (dotted line) discrete matrix. The closest modular and angular discrete values are used to represent the left and right values but, as shown on the diagram, for some values combinations, the error may be quite large and may result in quantization errors and cross-talk. To minimize such error, it is contemplated to toggle at every video frame, or at a different rate but fast enough to prevent any flicker perceived by the viewer, between two Modulo-Angular discrete values in order to so obtain an average, which is closer to the left-right values (full line).

Cross talk may be further reduced for fast moving images using LCD overdrive technique and using pre-angular adjustment, as will now be described.

Figure 13A:
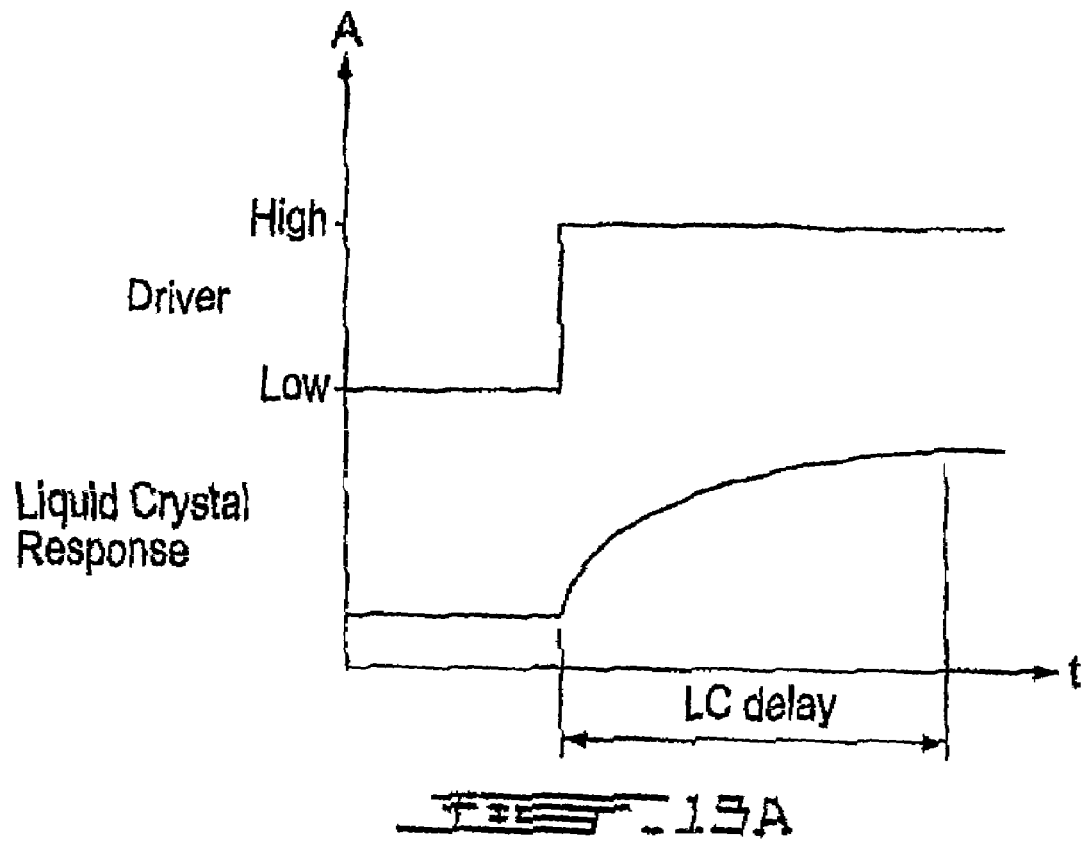
FIG. 13 illustrates effects of overdriving an LCD.
Figure 13B:
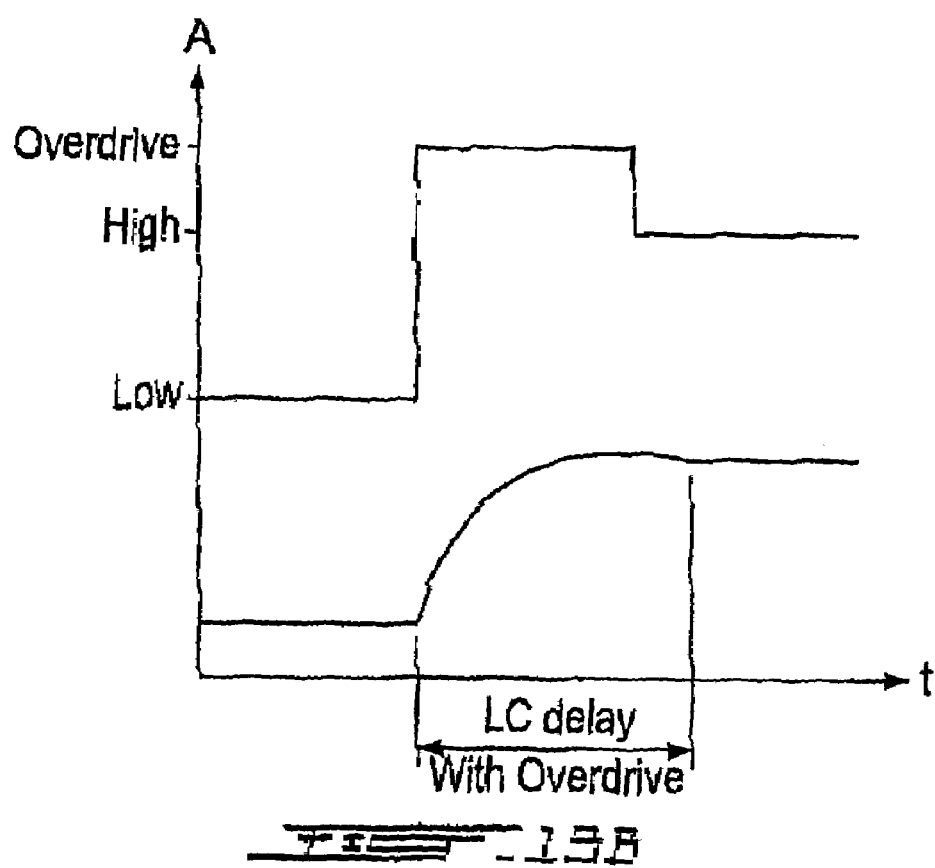

Overdriving a signal to a LCD during a short period of time, such as during one video frame for example, accelerates a change of orientation of the LC crystals and yields a final value faster (FIG. 13). This system may work as well with high to low pixel value changes. However overdriving may be limited at the extreme value of pixel intensity, i.e. zero and 255 for an 8-bit/color pixel, due to the lack of room to drive a higher or lower value. The present non-orthogonal stereoscopic display allows adding room for overdriving by reducing the angular range, thereby allowing an angular LCD of the display response faster at all values, which results in cross-talk reduction. Using a LCD overdrive as described hereinabove allows reducing crosstalk caused by the intermediary angle when the angle changes from one frame to the following frame, and reducing fast moving image smearing.

Figure 14:
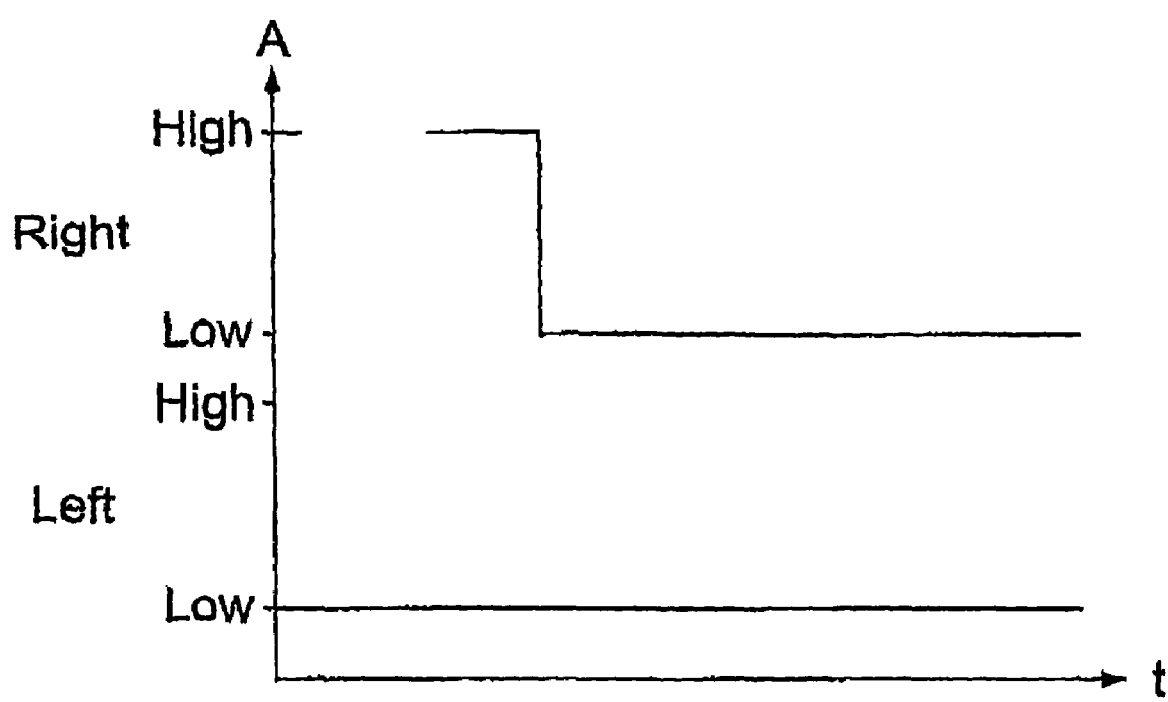
FIG. 14 illustrates cross-talk effects between right and left eyes.

Now, turning to cross-talk reduction for fast moving images by using pre-angular adjustment, it is noted that the intensity change in a first eye may cause spurious light in the second eye, for example when a pixel of the right eye image changes from bright to dark while the corresponding pixel of the left eye image is dark (FIG. 14).

Figure 15A:
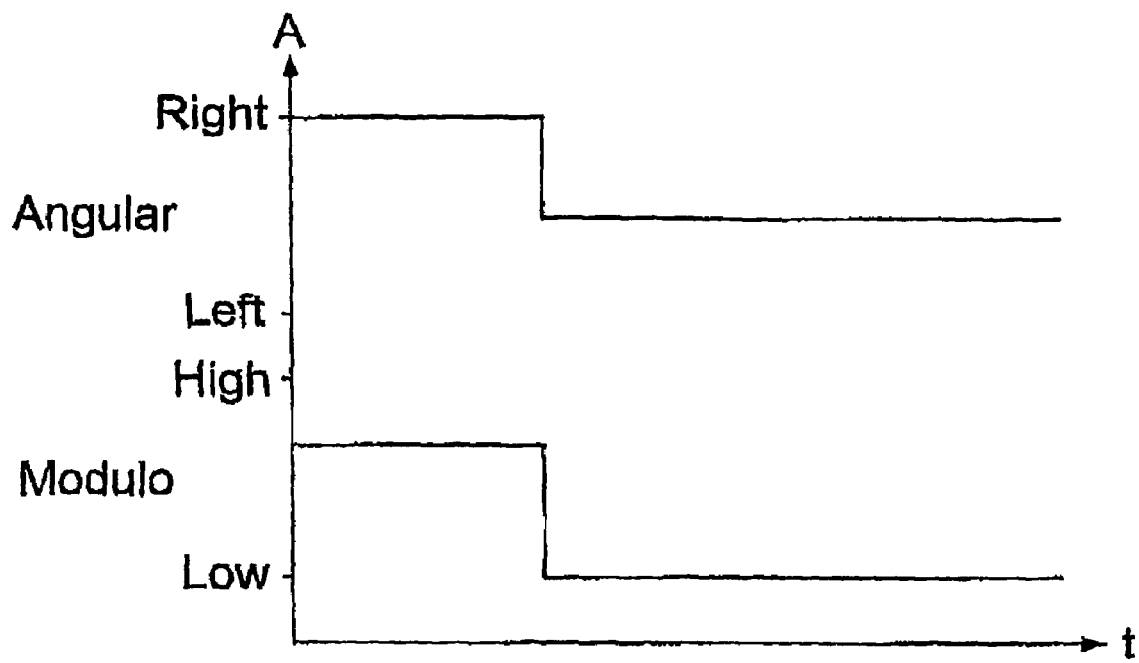
FIG. 15 illustrate effects of delaying an angular signal.
Figure 15B:
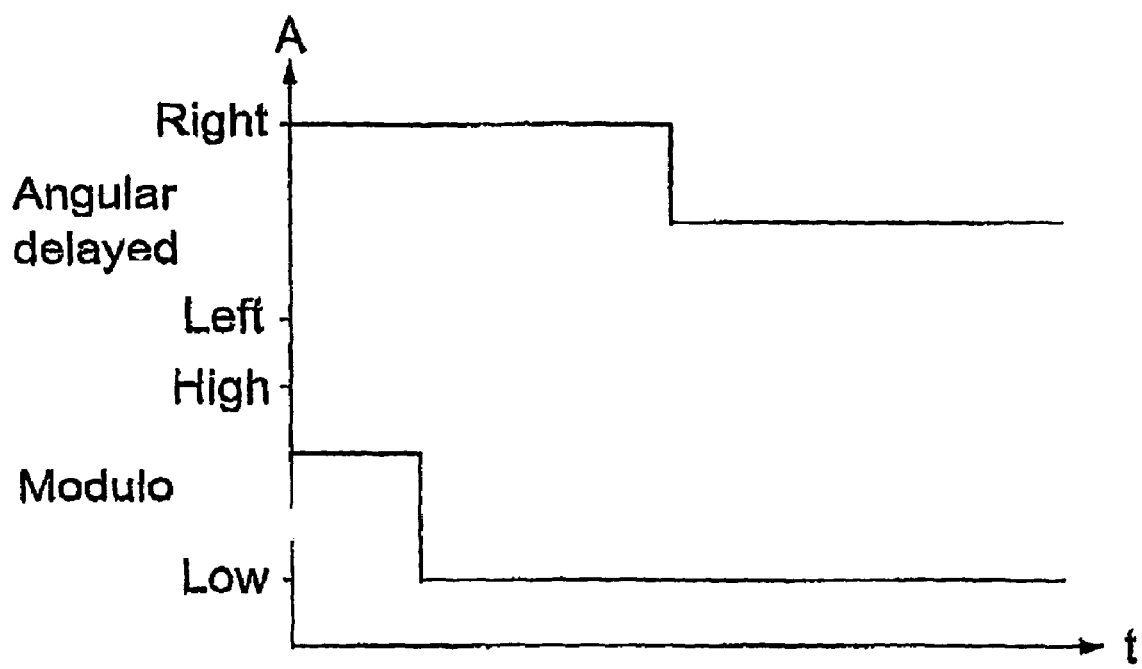
Figure 16A:
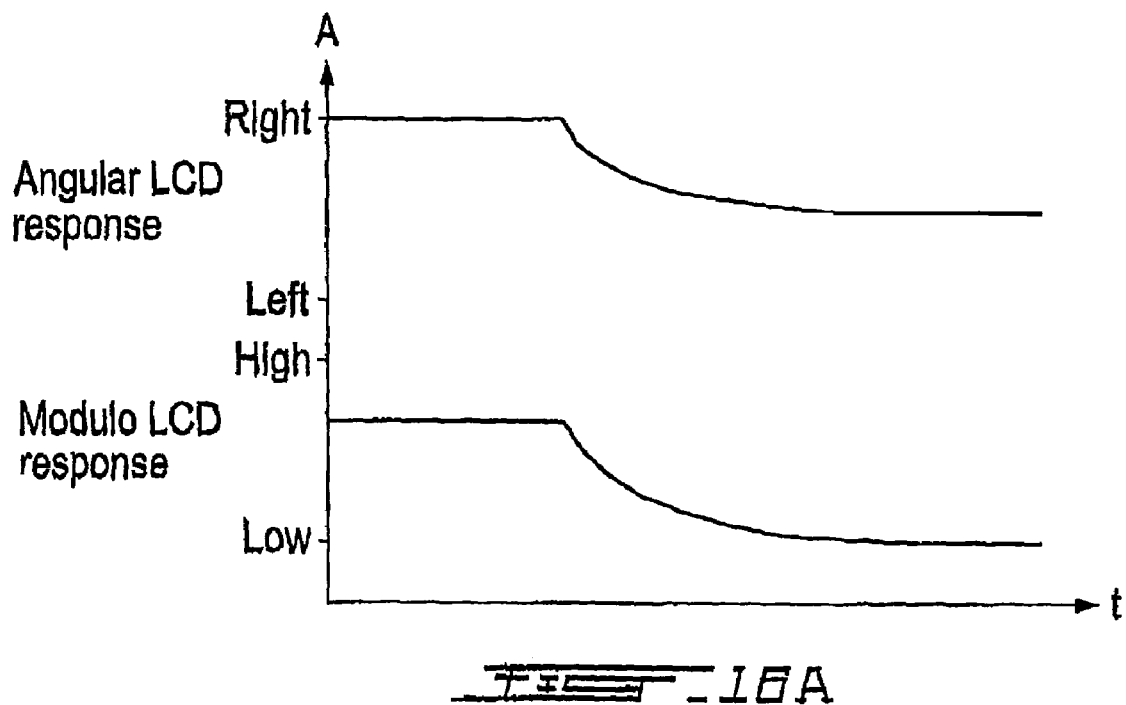
FIG. 16 show a corresponding response of the LCD pixel in the case of FIG. 15.
Figure 16B:
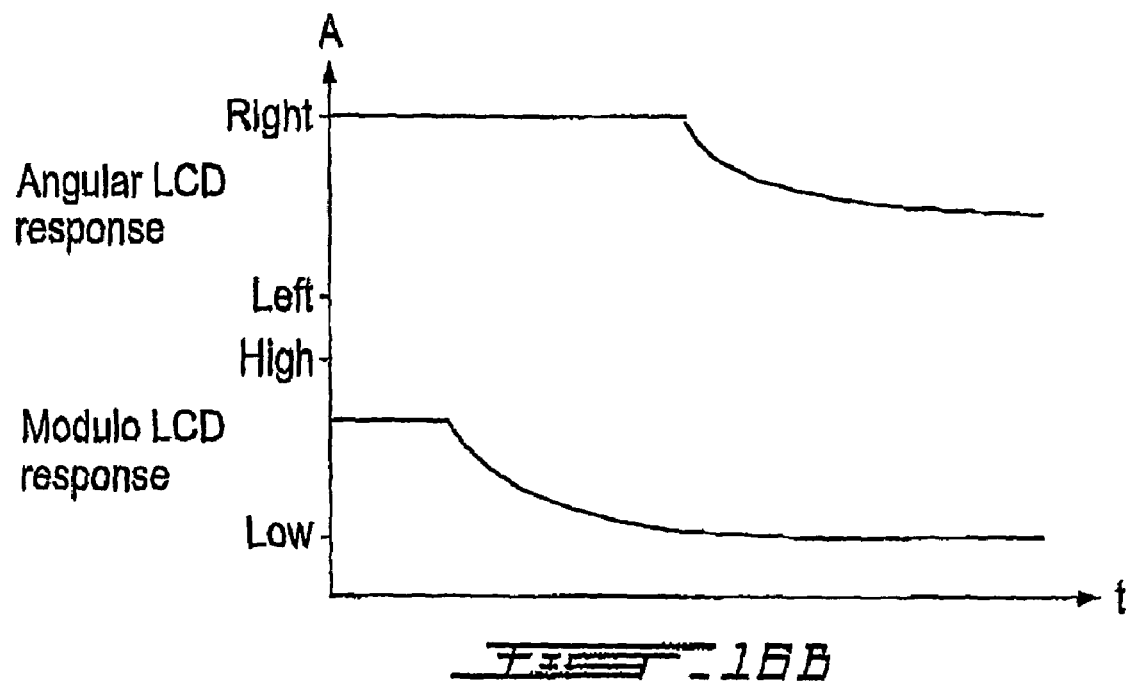
Figure 17A:
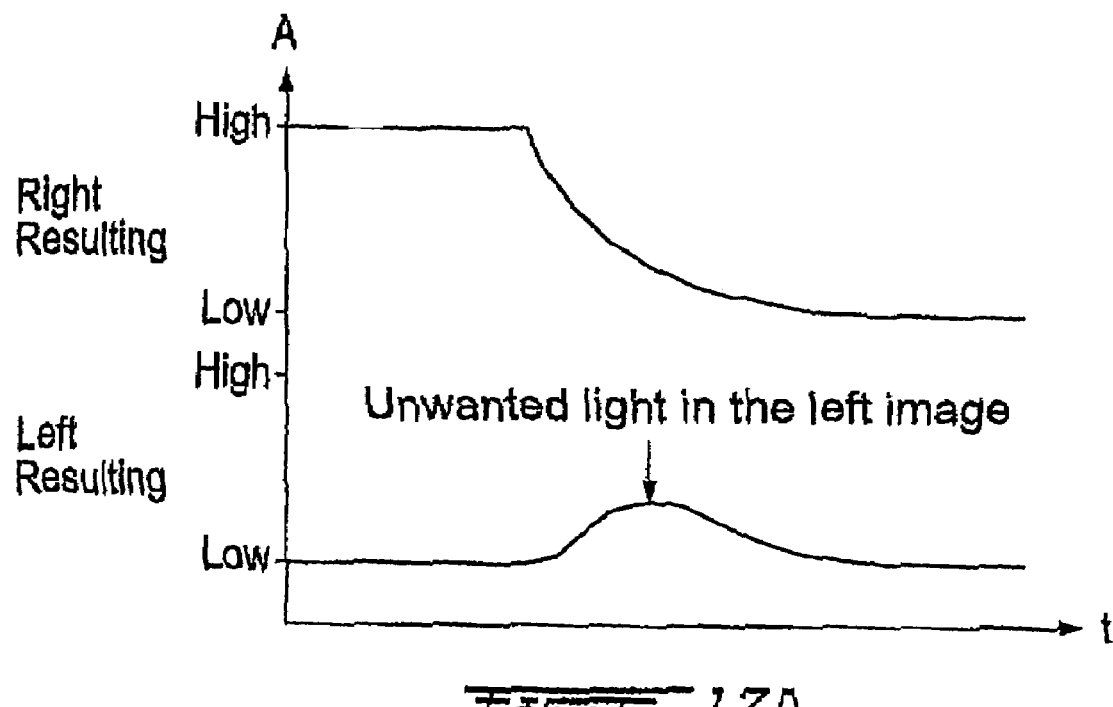
FIG. 17 show a resulting pixel intensity at the eye of the viewer, after the left and right polarized filter, in the case of FIG. 15.
Figure 17B:
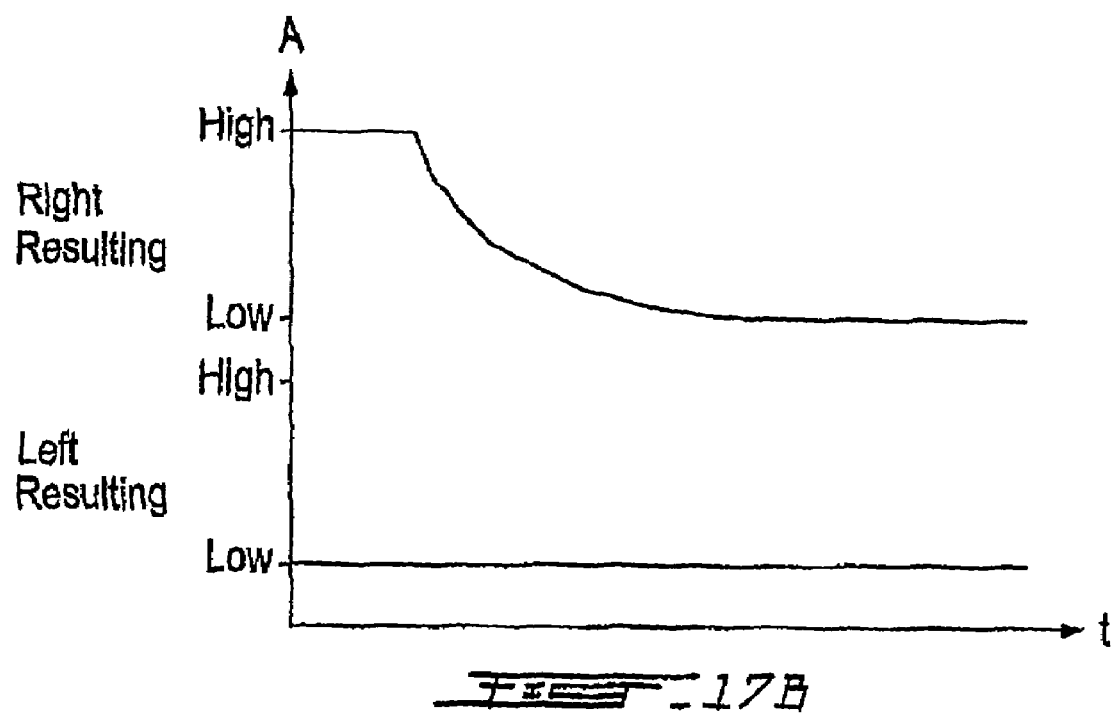

The top diagram of FIG. 15 shows a normal system and the bottom one shows a system where the angular signal has been delayed, by one the time of one video frame for example. The corresponding response of the LCD pixel is shown in FIG. 16. The resulting pixel intensity at the eye of the viewer, after the left and right polarized filter is shown in FIG. 17.

It may be seen that the slow response of the LCD creates a temporal gap during which the light passes through the left eye filter, which does not occur when the angular signal is delayed. Similarly, it may be demonstrated that a light bump appearing when the intensity of a pixel of one image goes from dark to bright while the other image is dark may be prevented by delaying the Modulo signal. A basic rule to apply delay may thus be stated as follows:

when a sub-pixel, the left or the right, goes from dark to bright while the other corresponding pixel, the right or the left, is dark, then delay the Modulo signal relative to the angular signal; and when a sub-pixel, the left or the right, goes from bright to dark while the other corresponding pixel, the right or the left, is dark, then delay the Angular signal relative to the Modulo signal.

The overdrive technique may also be used to advance a signal instead of delaying it. The overdrive and delay techniques may be used together.

Another problem is dealt with by the present invention. It is well known that superposition of two-pattern structures, such as two LCD cells for example, causes a Moiré pattern due to the interference of the two structures. With the LCD of the present invention, only one incident light ray goes through a same pixel and a same color filter, while the other two are blocked by a color filter. The corresponding pixel of the two LCD panels work together so that at a given angle, there is a mismatch of the modulo pixel and the angular pixel, which results in parallax cross talk between the left and right images and degradation of the image resolution. The interference between the two LCD panel pixel structures causes low display brightness, which adds to the low brightness inherent to stereoscopic systems since the light is split between the two eyes.

The present invention allows solving the interference problem of stacked LCD panels and improving contrast at wide view angle, by allowing the collimation of light using one or more Micro-Lens Arrays layer placed before, in-between and/or after, the two LCD panels. The examples illustrated in FIGS. 18 and 19 allow very large viewing angle since the light goes thought the pixels at a fixed angle, in contrast with standard LCD's in which the contrast reduces and the color shifts with the angle of view.

Figure 19:
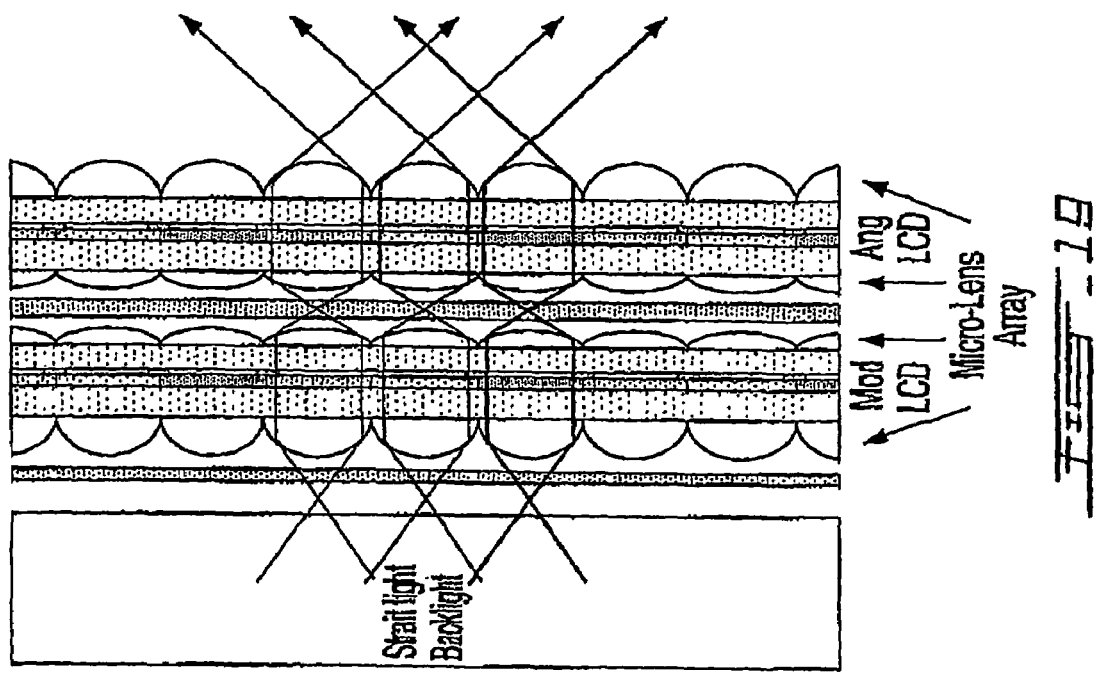
FIG. 19 is an example of a LCD display using micro-lens arrays to collimate light within every color sub-pixel, according to an embodiment of the present invention.
Figure 18:
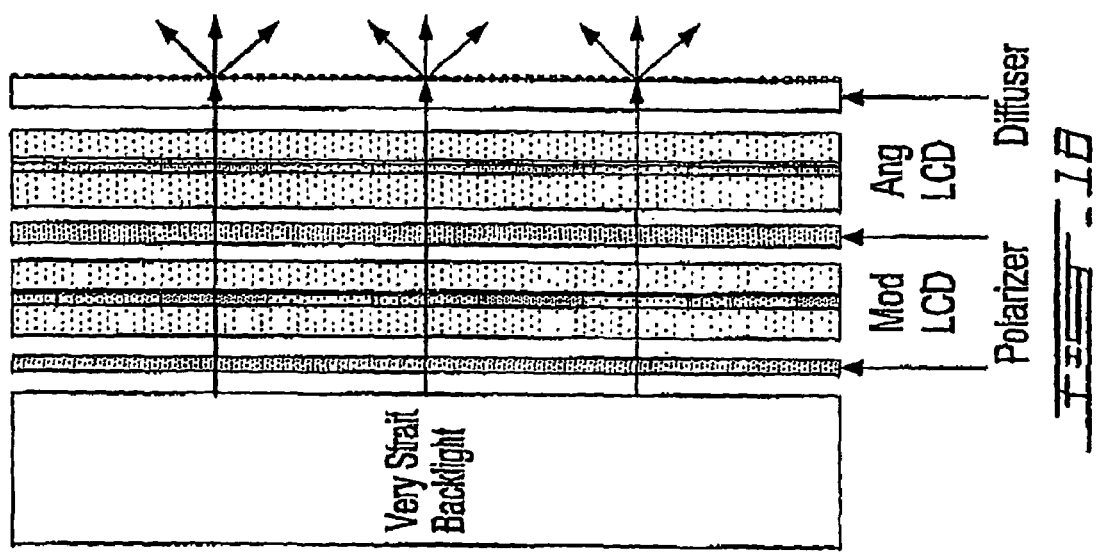
FIG. 18 is an example of a LCD display using a front diffuser and incident back light, according to an embodiment of the present invention.

FIG. 18 illustrates an embodiment using a front diffuser and incident back light. FIG. 19 illustrates an embodiment with micro-lens arrays to collimate light within every color sub-pixel.

Figure 20A:
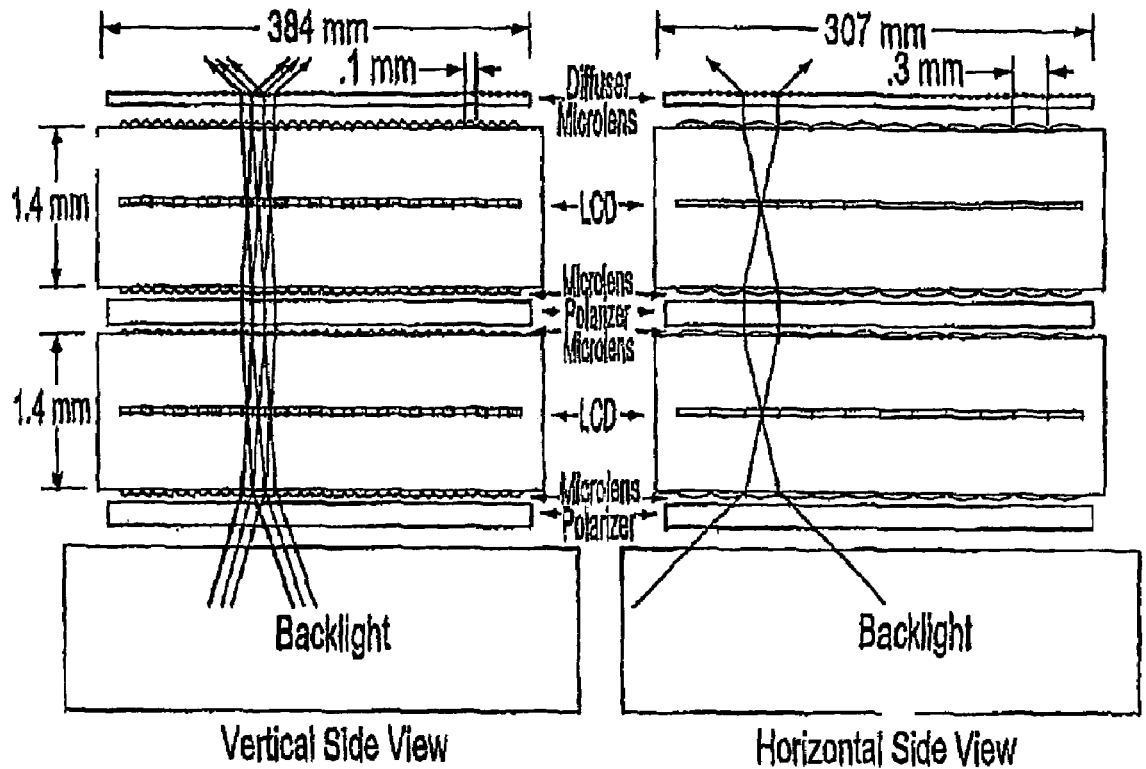
FIG. 20 show a lens arrays matching the pixel pitch for a 1280×1024 LCD.
Figure 20B:
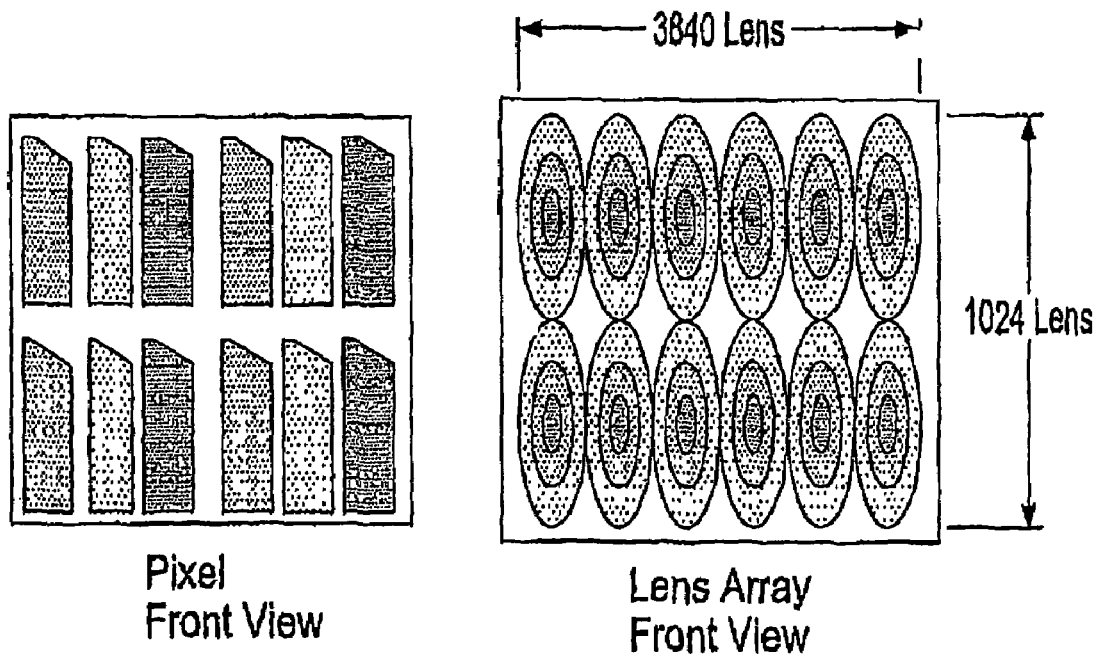

The pitch of the micro-lens arrays matches the LCD pixel pitch or sub-pixel pitch. FIG. 20 show a lens arrays matching the pixel pitch for a 1280×1024 LCD. The light radiated from the backlight is focused through the pixel aperture of the first LCD and through the corresponding pixel aperture of the second LCD. Then the light coming out of the aperture of the second LCD may be diffused either by micro-lens or by a light diffuser layer or both. The micro-lens arrays may also be Gradians Index (GRIN) lenses type.

For the micro-lens base examples below, the lens arrays matches the LCD pixel pitch as shown in FIG. 21.

Alternatively, the color filter of the LCD panel may be used to create a parallel barrier and derivate the red and the blue light rays to the left adjacent and right adjacent pixels column of the angular LCD respectively. The electronics driving the LCD may be made to compensate for the shift by advancing the red and retarding the green channel by one pixel or vice versa if the LCD panel color matrix is BGR instead of RGB (FIG. 22). Furthermore, the fixed angle of light inside the display of the present invention allows the use of cholesteric color and polarized filters, which allows brightness gain of up to 600%, thereby compensating for the low brightness discussed hereinabove.

Another method to increase the brightness of the display of the present invention makes use of a grating optical element for separating the color instead of filtering it, which, in combination with micro lens arrays, may yield an increase in brightness by 300%. A micro-ball array with black mask may be further used to diffuse the light without de-polarizing the light (as with the other type of diffuser), as illustrated in FIG. 23.

Furthermore, a micro-prism may be added to deviate the red and blue light ray so they are perpendicular to plane as the green, as shown in FIG. 24.

Such making use of micro-lens arrays or GRINS lens arrays resolves the problem associated with the superposition of two pattern structures, such as the LCD cells, discussed hereinabove in relation to FIG. 7, by preventing the light ray at certain angle to go through the modulo LCD pixel adjacent the corresponding angular LCD pixel (at the same coordinate), which otherwise would result in parallax cross-talk between left and right images and a degradation of the image resolution. Therefore, brightness increased by allowing more light going through pixel aperture, and a very large viewing angle is obtained because the light goes thought pixel at a fixed angle.

Figure 25:
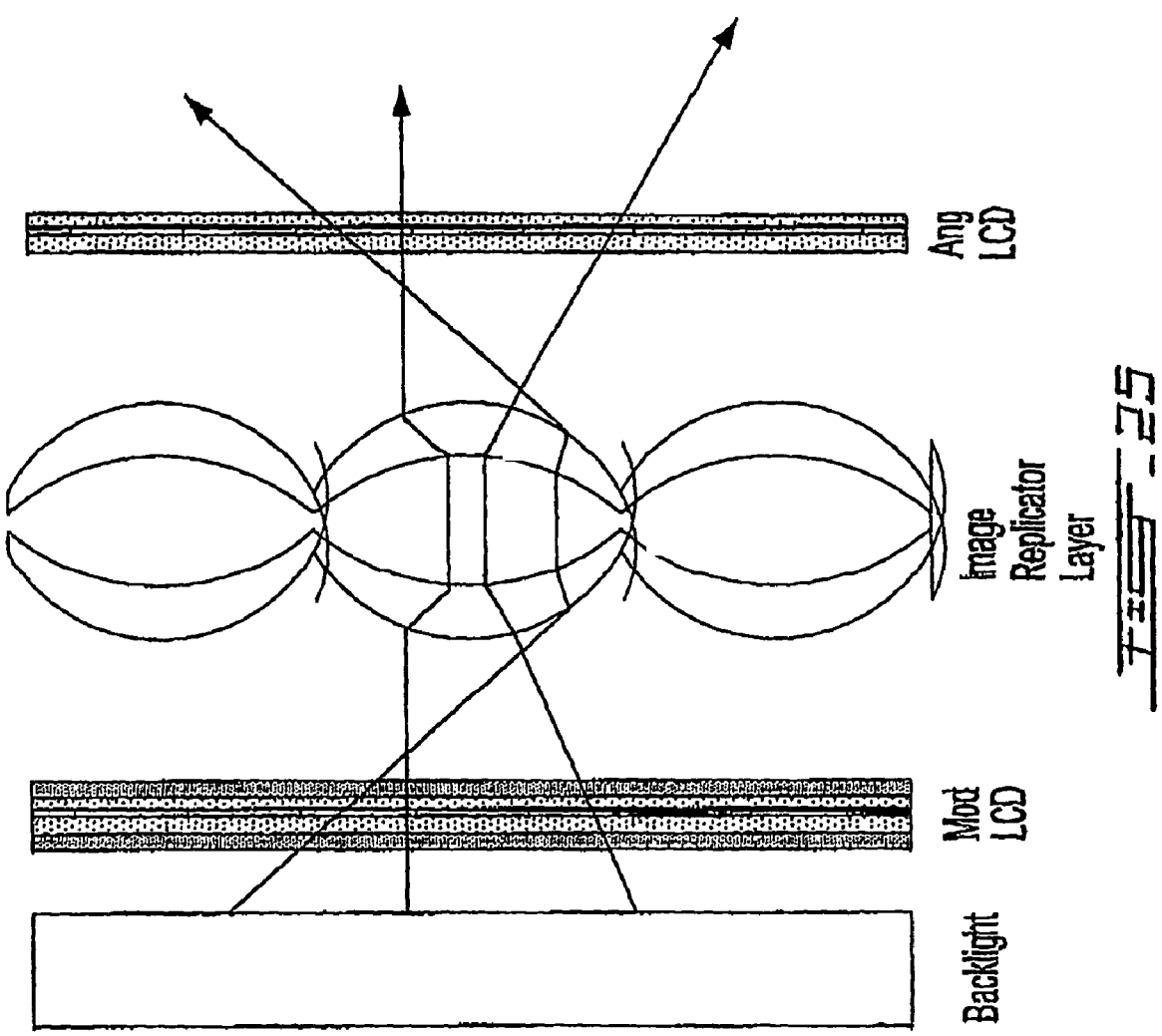
FIG. 25 illustrates a display using micro-lens arrays according to an embodiment of an aspect of the present invention.

Mini-lens arrays or GRINS lens arrays may further be used to perform the first and second LCD images replication (FIG. 25). One or more mini-Lens Arrays layers are placed in-between the two LCD of the stereoscopic display. These mini-lens arrays are selected to form a non-inverted 1:1 image projection, so that the light going through a sub-pixel of the first LCD goes through the corresponding sub-pixel of the second LCD. The pitch of the mini-lens arrays does not have to match the LCD pixel pitch. The mini-lens arrays may also be Gradians Index (GRIN) lenses type.

Figure 26:
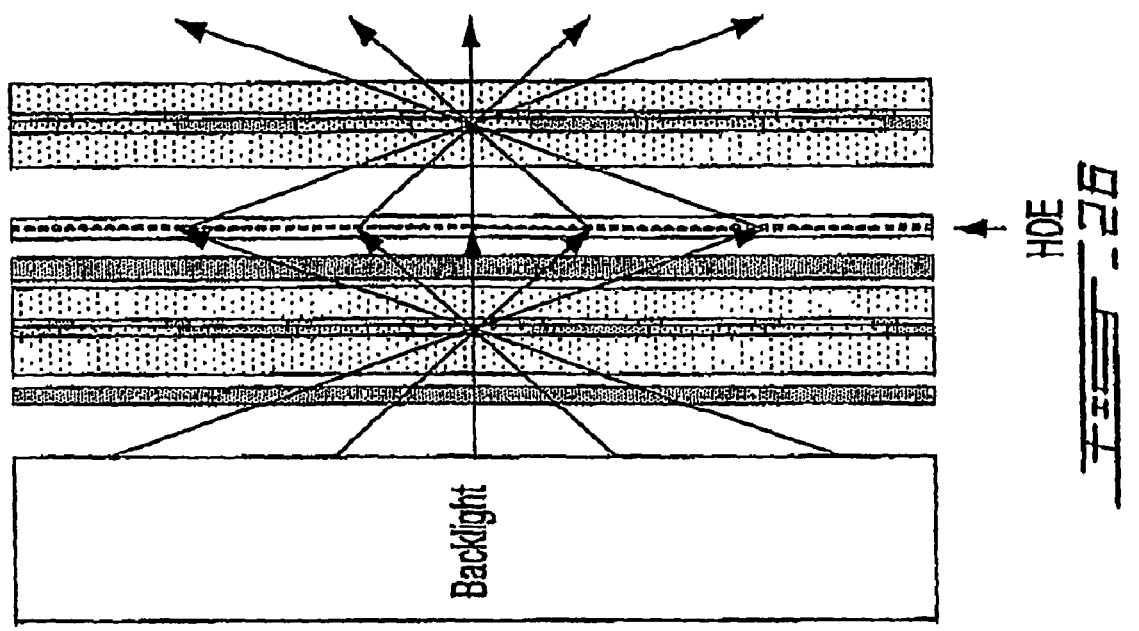
FIG. 26 illustrates a display using Holographic Optical Elements sheets according to an embodiment of an aspect of the present invention.

A display using Holographic Optical Elements sheets to redirect the light to the corresponding pixels of the first LCD and the second LCD is shown in FIG. 26.

Replication of the first and second LCD further resolves the problem associated with the superposition of two-pattern structure discussed above.

The LCDs of the present invention may be integrated as illustrated in FIG. 27, wherein the two LCD panels are integrated into one LCD panel. Since then the modulo and the angular LCD structures are close together, the light from the backlight is directed through both corresponding pixels even at wide angles. A typical LCD panel is made of two glass substrates of a thickness typically around 0.7 mm, a first glass substrate comprising the active part of the LCD and a glass substrate comprising the black matrix, the color filter and in certain case an IPO conductive layer acting as the anode or cathode. The liquid crystal is located in between these two substrates. For an integrated LCD according to the present invention, two active 0.7 mm substrates may be used, the first one controlled by the modular signal and the second one controlled by the angular signal. A very thin sheet, less than 0.2 mm, and made in glass or other material, comprising an IPO conductive layer and the color filter is placed between the two active glass substrates, and the middle thin sheet is the liquid crystal. The two active substrates and the color filter are to be aligned. The second active substrate may have a black matrix layer. Again, such a structure resolves the problem associated with the superposition of two-pattern structure discussed above.

What claimed is:

1. A polarized display, comprising:
    an intensity modulating matrix display having a front surface; and
    a polarizing matrix display in front of the intensity modulating matrix display, the polarizing matrix display having a front surface;
    wherein the polarized display is one of:
    a linear polarization display, each pixel of the polarizing matrix display being controllable and a rotation of a generated polarized light being varied over a range including 90 degrees and below; and
    an elliptical polarization display, each pixel of the polarizing matrix display being controllable and a phase between a fast and a slow axes of a polarized light coming from a corresponding pixel of the intensity modulating matrix display in a range including 180 degrees and below, and
    wherein the intensity modulating matrix display includes a backlight panel, a first polarizer, a first matrix display panel and a second polarizer, the polarizing matrix display including a second matrix display panel.

2. The polarized display according to claim 1, wherein the display is further connected to a controller arrangement, the controller arrangement controlling an overdrive of at least one of the first matrix display panel and the second matrix display panel.

3. A polarized display, comprising:
    an intensity modulating matrix display having a front surface; and
    a polarizing matrix display in front of the intensity modulating matrix display, the polarizing matrix display having a front surface;
    wherein the polarized display is one of:
    a linear polarization display, each pixel of the polarizing matrix display being controllable and a rotation of a generated polarized light being varied over a range including 90 degrees and below; and
    an elliptical polarization display, each pixel of the polarizing matrix display being controllable and a phase between a fast and a slow axes of a polarized light coming from a corresponding pixel of the intensity modulating matrix display in a range including 180 degrees and below; and
    wherein the intensity modulating matrix display includes a first LCD panel and the polarizing matrix display includes a second LCD panel, a first player wearing glasses with both eyes at a first polarized orientation and a second player wearing glasses at a second polarized orientation, yielding a two players-two displays-single screen-full screens display screen.

4. A polarized display, comprising:
    an intensity modulating matrix display having a front surface; and
    a polarizing matrix display in front of the intensity modulating matrix display, the polarizing matrix display having a front surface;
    wherein the polarized display is one of:
    a linear polarization display, each pixel of the polarizing matrix display being controllable and a rotation of a generated polarized light being varied over a range including 90 degrees and below; and
    an elliptical polarization display, each pixel of the polarizing matrix display being controllable and a phase between a fast and a slow axes of a polarized light coming from a corresponding pixel of the intensity modulating matrix display in a range including 180 degrees and below; and
    wherein the polarized display further includes an image replicator layer provided between the intensity modulating matrix display and the polarizing matrix display.

5. The polarized display according to claim 4, wherein the image replicator layer includes at least one of a mini-Lens Arrays layer where arrays are selected to form a non-inverted 1:1 image projection, and Index (GRIN) lenses.

6. The polarized display according to claim 4, wherein the image replicator layer includes at least one holographic optical elements device.

7. A polarized display, comprising:
    an intensity modulating matrix display having a front surface; and
    a polarizing matrix display in front of the intensity modulating matrix display, the polarizing matrix display having a front surface;
    wherein the polarized display is one of:
    a linear polarization display, each pixel of the polarizing matrix display being controllable and a rotation of a generated polarized light being varied over a range including 90 degrees and below; and
    an elliptical polarization display, each pixel of the polarizing matrix display being controllable and a phase between a fast and a slow axes of a polarized light coming from a corresponding pixel of the intensity modulating matrix display in a range including 180 degrees and below; and
    wherein both the intensity modulating matrix display and the polarizing matrix display comprise LCD panels.

8. The polarized display according to claim 7, wherein the polarizing matrix display includes a front half-length retarder.

9. The polarized display according to claim 8, wherein the polarizing matrix display includes a quarter-length retarder sheet in front of the front half-length retarder, the display being an elliptical polarization display.

10. The polarized display according to claim 7, wherein the polarized display is looked at with passive 3D glasses, yielding a stereoscopic screen.

11. The polarized display according to claim 7, wherein the intensity modulating matrix display includes at least one of a first micro-lens arrays layer and gradient index lenses (GRIN), the polarizing matrix display including at least one of a first micro-lens arrays layer and gradient index lenses (GRIN).

12. The polarized display according to claim 7, wherein the polarizing matrix display includes one of a front diffuser and a front microballs diffuser.

13. The polarized display according to claim 12, wherein the polarizing matrix display includes a microprism between the front surface thereof and the front microballs diffuser.

14. The polarized display according to claim 7, wherein the intensity modulating matrix display includes a grating optical element in the front surface thereof.

15. The polarized display according to claim 7, wherein the intensity modulating matrix display and the polarizing matrix display are integrated into one matrix display panel.

16. The polarized display according to claim 15 wherein the integrated matrix display panel includes two active glass substrates and a thin sheet of liquid crystals between the two substrates; the thin sheet including an a conductive layer and a color filter and the two active substrates and the color filter being aligned.

17. The polarized display according to claim 16, wherein the two active substrates are about 7 mm thick, and the thin sheet is less than about 2 mm thick.

18. A polarized display, comprising:
an intensity modulating matrix display having a front surface; and
a polarizing matrix display in front of the intensity modulating matrix display, the polarizing matrix display having a front surface;
wherein the polarized display is one of:
a linear polarization display, each pixel of the polarizing matrix display being controllable and a rotation of a generated polarized light being varied over a range including 90 degrees and below; and
an elliptical polarization display, each pixel of the polarizing matrix display being controllable and a phase between a fast and a slow axes of a polarized light coming from a corresponding pixel of the intensity modulating matrix display in a range including 180 degrees and below; and
wherein each pixel is subdivided into sub-pixels controlling a red, a green and a blue intensity, the intensity modulating matrix display and the polarizing matrix display respectively converting each corresponding sub-pixel into modular and angular signals given in a Cartesian system of angles as follows:

$$Modulo = \sqrt{(left^2 + right^2)} \quad (1)$$

$$Angular = \text{Arctan}\left(\frac{left}{right}\right) \quad (2)$$

where left is a value of a sub-pixel of a first image with a first linear polarization angle corresponding to a same sub-pixel on a second image with a second linear polarization angle, and right is a value of a sub-pixel of the second image corresponding to a same sub-pixel on the first image.

19. The polarized display according to claim 18, wherein the modular and angular signals are given in an oblique system of angle $\omega = \alpha + \beta$ by transformed modular and angular signals as follows:

$$Modulo' = \sqrt{(L^2\cos^2\theta + 2\ L\ R\ \cos(\omega + \theta) + R^2\cos^2(\omega + \theta))} \quad (9)$$

$$Angulo' = \arctan\left(\frac{L\cos\theta + R\cos(\omega + \theta)}{L\sin\theta + R\sin(\omega + \theta)}\right) \quad (10)$$

where $2\theta = (90° - (\alpha + \beta))$, L is value of a sub-pixel of a first image with a first linear polarization angle $\beta$ corresponding to a same sub-pixel on a second image with a second linear polarization angle $\alpha$, and R is a value of a sub-pixel of the second image corresponding to a same sub-pixel on the first image.

20. The polarized display according to claim 19, further comprising a first and a second linear polarized filters located side by side in a plane generally parallel to the front surface of the polarizing matrix display, in front thereof; the first linear polarized filter being at an angle A at 90 degrees from the first linear polarization angle $\beta$ and the second linear polarized filter being at an angle B at 90 degrees from the second linear polarization angle $\alpha$, wherein the left and right values are recovered from the transformed modular and angular signals with the first and second filters at A and B angles as follows:

$$\sqrt{(L^2 + 4LR\cos\theta\sin\theta + R^2)} \cdot \cos\left(\arctan\left(\frac{L\sin\theta + R\cos\theta}{L\cos\theta + R\sin\theta}\right) + \theta\right) = \quad (11)$$
$$\text{left} \cdot \cos(2\theta)$$

$$\sqrt{(L^2 + 4LR\cos\theta\sin\theta + R^2)} \cdot \sin\left(\arctan\left(\frac{L\sin\theta + R\cos\theta}{L\cos\theta + R\sin\theta}\right) - \theta\right) = \quad (12)$$
$$\text{right} \cdot \cos(2\theta)$$

where $2\theta = (90° - (\alpha + \beta)) = A - \alpha = B - \beta$.

21. The polarized display according to claim 20, wherein the filters are mounted on viewer spectacles.

22. The polarized display according to claim 21, wherein the viewer spectacles comprise a parasite elliptical light eliminator.

23. The polarized display according to claim 19, wherein each frame is toggled between two Modulo-Angular discrete signals to yield an average thereof thereby reducing cross talk between the first and second images.

24. The polarized display according to claim 18, further comprising:
a memory arrangement storing transformed signals.

25. The polarized display according to claim 18, wherein the display is further connected to a controller arrangement, the controller arrangement controlling delay of the modular and angular signals, wherein i) when a sub-pixel of the first image goes from dark to bright while a corresponding pixel of the second image is dark, the modular signal is delayed relative to the angular signal; and ii) when the sub-pixel of the first image goes from bright to dark while the corresponding pixel of the second image is dark, the angular signal is delayed relative to the modular signal.

26. A polarized display, comprising:
an intensity modulating matrix display having a front surface; and
a polarizing matrix display in front of the intensity modulating matrix display, the polarizing matrix display having a front surface;
wherein the polarized display is one of:
a linear polarization display, each pixel of the polarizing matrix display being controllable and a rotation of a generated polarized light being varied over a range including 90 degrees and below; and
an elliptical polarization display, each pixel of the polarizing matrix display being controllable and a phase between a fast and a slow axes of a polarized light coming from a corresponding pixel of the intensity modulating matrix display in a range including 180 degrees and below; and
wherein the intensity modulating matrix display includes a first LCD panel and the polarizing matrix display includes a second LCD panel, the polarizing matrix display including a filter sheet on the front surface thereof, yielding an enhanced 2D screen.

27. A polarized display, comprising:
an intensity modulating matrix display having a front surface; and
a polarizing matrix display in front of the intensity modulating matrix display, the polarizing matrix display having a front surface;

wherein the polarized display is one of:
a linear polarization display, each pixel of the polarizing matrix display being controllable and a rotation of a generated polarized light being varied over a range including 90 degrees and below; and
an elliptical polarization display, each pixel of the polarizing matrix display being controllable and a phase between a fast and a slow axes of a polarized light coming from a corresponding pixel of the intensity modulating matrix display in a range including 180 degrees and below; and
wherein the intensity modulating matrix display includes a first LCD panel and the polarizing matrix display includes a second LCD panel, the polarized display being looked at with a non 3D type of polarized glasses, yielding an enhanced 2D screen.

28. A polarized display, comprising:
an intensity modulating matrix display having a front surface; and
a polarizing matrix display in front of the intensity modulating matrix display, the polarizing matrix display having a front surface;
wherein the polarized display is one of:
a linear polarization display, each pixel of the polarizing matrix display being controllable and a rotation of a generated polarized light being varied over a range including 90 degrees and below: and
an elliptical polarization display, each pixel of the polarizing matrix display being controllable and a phase between a fast and a slow axes of a polarized light coming from a corresponding pixel of the intensity modulating matrix display in a range including 180 degrees and below; and
wherein the intensity modulating matrix display includes a first LCD panel and the polarizing matrix display includes a second LCD panel, a private image being shown on the second LCD while a complete white image is displayed on the first LCD, whereby only a user wearing polarized glasses is able to see the private image, other people seeing only a white screen.

29. A polarized display, comprising:
an intensity modulating matrix display having a front surface; and
a polarizing matrix display in front of the intensity modulating matrix display, the polarizing matrix display having a front surface;
wherein the polarized display is one of:
a linear polarization display, each pixel of the polarizing matrix display being controllable and a rotation of a generated polarized light being varied over a range including 90 degrees and below: and
an elliptical polarization display, each pixel of the polarizing matrix display being controllable and a phase between a fast and a slow axes of a polarized light coming from a corresponding pixel of the intensity modulating matrix display in a range including 180 degrees and below; and
wherein the intensity modulating matrix display includes a first LCD panel and the polarizing matrix display includes a second LCD panel, a private image being shown on the second LCD while a fake image is displayed on the first LCD, whereby only a user wearing polarized glasses is able to see the private image, other people seeing the fake image.

\* \* \* \* \*